US009865272B2

(12) United States Patent
Blesser et al.

(10) Patent No.: US 9,865,272 B2
(45) Date of Patent: *Jan. 9, 2018

(54) INSERTING WATERMARKS INTO AUDIO SIGNALS THAT HAVE SPEECH-LIKE PROPERTIES

(71) Applicant: TLS Corp., Cleveland, OH (US)

(72) Inventors: Barry Blesser, Belmont, MA (US); Robert Dye, Saint Petersburg, FL (US)

(73) Assignee: TLS. Corp., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/459,721

(22) Filed: Mar. 15, 2017

(65) Prior Publication Data

US 2017/0186438 A1 Jun. 29, 2017

Related U.S. Application Data

(63) Continuation of application No. 15/133,825, filed on Apr. 20, 2016, now Pat. No. 9,626,977.

(60) Provisional application No. 62/196,897, filed on Jul. 24, 2015.

(51) Int. Cl.
*G06F 17/00* (2006.01)
*G10L 19/018* (2013.01)
*G10L 19/02* (2013.01)

(52) U.S. Cl.
CPC ........ *G10L 19/018* (2013.01); *G10L 19/0204* (2013.01)

(58) Field of Classification Search
CPC . G10L 19/018; G10L 19/0204; H04N 19/467; H04N 21/23892; H04N 21/8358; G06T 2201/0052; G06T 2201/0051; G06T 2201/0061
See application file for complete search history.

(56) References Cited

U.S. PATENT DOCUMENTS

| | | | |
|---|---|---|---|
| 5,029,217 A | 7/1991 | Chabries et al. |
| 5,450,490 A | 9/1995 | Jensen et al. |
| 5,483,276 A | 1/1996 | Brooks et al. |
| 5,574,962 A | 11/1996 | Fardeau et al. |

(Continued)

FOREIGN PATENT DOCUMENTS

| | | |
|---|---|---|
| WO | 2006116270 | 11/2006 |

OTHER PUBLICATIONS

Arbitron, Critical Band Encoding Technology Audio Encoding System From Arbitron; Document 1050-1054; Revision E; pp. 1-27; Feb. 2008.

(Continued)

*Primary Examiner* — Andrew C Flanders

(74) *Attorney, Agent, or Firm* — Renner, Otto, Boisselle & Sklar, LLP

(57) ABSTRACT

A method for a machine or group of machines to watermark an audio signal includes receiving an audio signal and a watermark signal including multiple symbols, and inserting at least some of the multiple symbols in multiple spectral channels of the audio signal, each spectral channel corresponding to a different frequency range. Optimization of the design incorporates minimizing the human auditory system perceiving the watermark channels by taking into account perceptual time-frequency masking, pattern detection of watermarking messages, the statistics of worst case program content such as speech, and speech-like programs.

36 Claims, 23 Drawing Sheets

(56) References Cited

U.S. PATENT DOCUMENTS

| | | | |
|---|---|---|---|
| 5,574,963 | A | 11/1996 | Weinblatt et al. |
| 5,579,124 | A | 11/1996 | Aija et al. |
| 5,581,800 | A | 12/1996 | Fardeau et al. |
| 5,764,763 | A | 6/1998 | Jensen et al. |
| 5,787,334 | A | 7/1998 | Fardeau et al. |
| 6,421,445 | B1 | 7/2002 | Jensen et al. |
| 6,571,144 | B1 | 5/2003 | Moses et al. |
| 6,621,881 | B2 | 9/2003 | Srinivasan |
| 6,674,876 | B1 | 1/2004 | Hannigan et al. |
| 6,683,958 | B2 | 1/2004 | Petrovic |
| 6,845,360 | B2 | 1/2005 | Jensen et al. |
| 6,862,355 | B2 | 3/2005 | Kolessar et al. |
| 6,871,180 | B1 | 3/2005 | Neuhauser et al. |
| 6,996,237 | B2 | 2/2006 | Jensen et al. |
| 7,003,790 | B1 | 2/2006 | Inoue et al. |
| 7,031,491 | B1 | 4/2006 | Donescu et al. |
| 7,222,071 | B2 | 5/2007 | Neuhauser et al. |
| 7,239,981 | B2 | 7/2007 | Kolessar et al. |
| 7,316,025 | B1 | 1/2008 | Aijala et al. |
| 7,395,211 | B2 | 7/2008 | Watson et al. |
| 7,471,987 | B2 | 12/2008 | Crystal et al. |
| 7,483,835 | B2 | 1/2009 | Neuhauser et al. |
| 7,483,975 | B2 | 1/2009 | Kolessar et al. |
| 7,640,141 | B2 | 12/2009 | Kolessar et al. |
| 7,664,274 | B1 | 2/2010 | Graumann |
| 7,961,881 | B2 | 6/2011 | Jensen et al. |
| RE42,627 | E | 8/2011 | Neuhauser et al. |
| 8,099,285 | B2 | 1/2012 | Smith et al. |
| 8,554,569 | B2 | 10/2013 | Chen et al. |
| 8,869,187 | B2 | 10/2014 | Wright et al. |
| 2002/0138830 | A1 | 9/2002 | Nagaoka et al. |
| 2003/0128861 | A1 | 7/2003 | Rhoads |
| 2003/0219143 | A1 | 11/2003 | Moskowitz et al. |
| 2003/0231785 | A1 | 12/2003 | Rhoads et al. |
| 2004/0068399 | A1 | 4/2004 | Ding |
| 2005/0157907 | A1 | 7/2005 | Reed et al. |
| 2008/0275697 | A1 | 11/2008 | Kentish et al. |
| 2009/0076907 | A1 | 3/2009 | Litwin et al. |
| 2009/0144784 | A1 | 6/2009 | Li et al. |
| 2009/0192805 | A1 | 7/2009 | Topchy et al. |
| 2009/0262932 | A1 | 10/2009 | Petrovic |
| 2010/0057231 | A1 | 3/2010 | Slater et al. |
| 2010/0125508 | A1 | 5/2010 | Kelly et al. |
| 2010/0131970 | A1 | 5/2010 | Falcon |
| 2010/0303284 | A1 | 12/2010 | Hannigan et al. |
| 2011/0093104 | A1 | 4/2011 | Blesser |
| 2011/0173012 | A1 | 7/2011 | Rettelbach et al. |
| 2011/0238425 | A1 | 9/2011 | Neuendorf et al. |
| 2011/0305352 | A1 | 12/2011 | Villemoes et al. |
| 2012/0089393 | A1 | 4/2012 | Tanaka |
| 2012/0159528 | A1 | 6/2012 | Toney, Jr. |
| 2012/0274459 | A1 | 11/2012 | Jaisimha et al. |
| 2013/0054350 | A1 | 2/2013 | Camps |
| 2013/0171926 | A1 | 7/2013 | Perret et al. |
| 2013/0173275 | A1 | 7/2013 | Liu et al. |
| 2013/0211564 | A1 | 8/2013 | Wabnik et al. |
| 2014/0073276 | A1 | 3/2014 | Lyer et al. |
| 2014/0297271 | A1 | 10/2014 | Geiser |
| 2015/0071446 | A1 | 3/2015 | Sun et al. |
| 2017/0025128 | A1 | 1/2017 | Blesser et al. |
| 2017/0025129 | A1 | 1/2017 | Blesser et al. |

OTHER PUBLICATIONS

Blesser, Barry, Director of Engineering, 25-Seven Systems, Inc.; Technical Properties of Arbitron's PPM System; pp. 1-8; Aug. 18, 2009.

International Search Report and Written Opinion dated Mar. 13, 2015 for corresponding International Application No. PCT/US2014/068485.

Kirbiz S et al: "Decode-Time Forensic Watermarking of AAC Bitstreams", IEEE Transactions on Information Forensics and Security, IEEE, Piscataway, NJ, US, vol. 2, No. 4, Dec. 1, 2007, pp. 683-696, XP011328824, ISSN: 1556-6013, DOI: 10-1109/TIFS.2007.908194.

Serap Kirbiz et al: "Forensic Watermarking During AAC Playback", Multimedia and Expo, 2007 IEEE International Conference on, IEEE, PI, Jul. 2007, pp. 1111-1114, XP031123824, ISBN: 978-1-4244-1016-3.

International Search Report and Written Opinion dated Sep. 8, 2017 for corresponding International Application No. PCT/IB2017/052253.

INSERTING WATERMARKS INTO AUDIO SIGNALS THAT HAVE SPEECH-LIKE PROPERTIES

FIELD OF THE INVENTION

The present disclosure relates to audio processing. More particularly, the present disclosure relates to methods and machines for inserting watermarks in a specific type of audio signals.

BACKGROUND

Audio watermarking is the process of embedding information in audio signals. To embed this information, the original audio may be changed or new components may be added to the original audio. Watermarks may include information about the audio including information about its ownership, distribution method, transmission time, performer, producer, legal status, etc. The audio signal may be modified such that the embedded watermark is imperceptible or nearly imperceptible to the listener, yet may be detected through an automated detection process.

Watermarking systems typically have two primary components: an encoder that embeds the watermark in a host audio signal, and a decoder that detects and reads the embedded watermark from an audio signal containing the watermark. The encoder embeds a watermark by altering the host audio signal. Watermark symbols may be encoded in a single frequency band or, to enhance robustness, symbols may be encoded redundantly in multiple different frequency bands. The decoder may extract the watermark from the audio signal and the information from the extracted watermark.

The watermark encoding method may take advantage of perceptual masking of the host audio signal to hide the watermark. Perceptual masking refers to a process where one sound is rendered inaudible in the presence of another sound. This enables the host audio signal to hide or mask the watermark signal during the time of the presentation of a loud tone, for example. Perceptual masking exists in both the time and frequency domains. In the time domain, sound before and after a loud sound may mask a softer sound, so called forward masking (on the order of 50 to 300 milliseconds) and backward masking (on the order of 1 to 5 milliseconds). Masking is a well know psychoacoustic property of the human auditory system. In the frequency domain, small sounds somewhat higher or lower in frequency than a loud sound's spectrum are also masked even when occurring at the same time. Depending on the frequency, spectral masking may cover several hundred hertz.

The watermark encoder may perform a masking analysis to measure the masking capability of the audio signal to hide a watermark. The encoder models both the temporal and spectral masking to determine the maximum amount of watermarking energy that can be injected. However, the encoder can only be successful if the audio signal has sufficient energy to mask the watermark. In some cases, masking energy may be limited to certain temporal and spectral regions.

Internet streaming, television audio and broadcast radio are typical examples of audio that may benefit from watermarking. While there are many possible benefits to be derived from watermarking, it has been frequently deployed as part of an audience ratings system because advertising revenue is based on the number of listeners who will be exposed to a commercial message. There are large commercial implications for the design of a watermarking technology that is as accurate as possible.

In the prior art of watermarking technology, designs assumed a generic definition of audio, which is basically any signal that is intended to be heard by human listeners in the range of 20 Hz to 20 kHz. Because the designers of such watermarking system had not made any assumptions about the properties of the audio signal to be watermarked, prior art does not consider the fact that each type of audio has its own trade-offs that strongly influence the design of the system. For example, high speed spoken speech has very different properties from easy jazz, which is very different from classical symphonies. There are probably a dozen or more types of audio, which each have very different properties and these properties will play a strong role on the watermarking system accuracy. From an ideal perspective, one could have a particular watermarking architecture for each type of audio program.

SUMMARY OF THE INVENTION

A more careful examination of the types of audio shows that one of them is a much bigger challenge than the others, namely speech and speech-like audio. This type of audio is unique because of the temporal and spectral burstiness. The statistics of speech and speech-like audio have a very limited spectral width and a short temporal duration. Most audio has wider spectral width and/or longer durations. By not recognizing the importance and uniqueness of speech and speech-like audio, prior art designs fail or perform badly for this type of audio.

The commercial consequences of not having a watermarking system that performs well for all types of program are very significant. Some announcers have had their careers destroyed because they were considered to have no listeners. There are stories of announcers who had a large listenership, as evidenced by listeners calling into the broadcast with comments, but who were taken off the air because of the lack of advertising revenue resulting from the incorrect lack of listener ratings. Similarly, some types of programs, such as easy jazz, have disappeared for similar reasons.

This disclosure focuses on technology to improve the accuracy of watermarking systems for these difficult cases. The weak performance of prior art watermarking systems with speech indicates that the prior art did not recognize the importance of a design that handles these difficult cases. The prior art has not recognized the need to identify the most challenging types of audio and to then design the watermarking system for this type. Less challenging types of audio will work well without optimizing the watermarking architecture. Optimal processing of these difficult cases ripples through the entire design process, influencing a vast number of parameters and design modules. This disclosure describes a watermarking architecture that correctly handles these difficult cases.

At the highest level, a watermarking system has a digital information payload that must be embedded into the audio signal. The payload could be the station identification, the network identification, the time code, and so on. Any digital information can be part of the payload, which is nothing more than a collection of bits. Each bit of the payload has to be converted into one or more an audio watermarking signals that are added to the program audio. The watermarked audio output is a combination of the original audio program and audio created to represent the digital payload.

The way that the payload bits are organized and the way that they are represented in the watermarked audio determines the system properties. Let us define a watermark "message" as the unit that contains all of the encoded payload bits. The unit of encoding is called a symbol. If there were 64 payload bits and if each bit mapped into a single symbol, then there would be 64 symbols per message. If each symbol contained 4 bits of information, then there would be 16 symbols per message.

To illustrate the encoding mapping between payload bits and symbols, consider a hypothetical system where a digital 1 as the value of a symbol produces an audio signal composed of a 1.01 kHz sinewave lasting 400 milliseconds and a digital 0 produces an audio signal composed of a of 1.03 kHz sinewave also lasting 400 milliseconds. Encoding is the process of converting a digital number into one of many symbols, which are audio segments themselves. When the decoder detects a 1.01 kHz audio segment, it maps that into a digital 1. In the following discussions, the concepts of a message and symbol are used to represent digital information as well representing the audio segments that contain that information.

The messages are intended to be decoded at the listener's environment and the resulting decoded payload is then sent to a host computer to allocate credit for a listener to a particular station. Decoding is the process of analyzing the segments of audio that represent the symbols, which are then combined to become the full message.

A watermarking system has two distinct audio signals combined and two types of listeners. There are human listeners who attend to the program content, and there are decoders that attend to the watermarked payload. Ideally, when a listener can hear the program successfully, the decoder can hear the watermark payload (as encoded into symbols and messages) correctly. Conversely, if the listener cannot hear the program, the decoder should not hear the watermark messages. Moreover, the listener should not be able to hear the watermark messages when listening to the program and the decoder should not be degraded by the audio program. And finally, these criteria should be true for all types of audio program and listening environments. There is no prior art that deals with all of these criteria, in part because there is a lack of understanding of the trade-offs required to even approximate this goal.

Since the digital watermarking payload is constant for long periods of time, and perhaps never changing in the case of the station ID, it would be incorrect to assume that the message length can be extremely long. Message duration is controlled by the listener, who may be changing stations at a rapid rate, listening to one station for a 1 minute and then switching to another. The decoder must successfully acquire the watermarking payload during the time that the listener has selected that station. Decode intervals typically range from 15 minutes to 15 seconds. The worst case is obviously the 15 second capture time. The full message must be decoded at this rate.

Depending on the spectral width of the symbols, messages can be centered at any number of frequencies, each of which becomes an independent spectral channel. The same message can be encoded at 1 kHz as it can be at 1.5 kHz. Multiple spectral channels, each of which can deliver the same message, increase the system redundancy. But more importantly, however, because masking depends on the program spectral content, some spectral channels may have strong masking while others may have none. A given piece of audio program might have a musical note at 400 Hz with overtones at 800, 1200, 1600, etc. A spectral channel at 850 Hz (just above the 800 Hz overtone) would have a high level of masking but a channel at 1000 would have virtually none. A large number of channels, each with the same messages, are likely to have one or more with good quality masking. There can be no assurance that any given channel will have enough amplitude to be decoded in the listener's environment, especially when environmental sounds with a variety of spectral content may overwhelm the message in a given channel.

It is unlikely that a given channel will have adequate masking for the full duration of a message. However, given the redundancy (repetition of symbols in multiple messages and spectral channels) a composite message can be assembled from symbols scattered over the channels and time. For example, S1 (first symbol in a message) might be correctly decoded on channel 3 at time t1, while S2 might be decoded on channel 4 at time t2, etc. This is the assembly process at the decoder: looking at multiple messages in time and messages in multiple channels. For this process to be successful, symbol decoding must be reliable when there is adequate masking in a given channel at a given time. The system design is based on optimizing the masking and decoding of a single symbol.

The worst case audio program, such as speech, has regions of masking that are very limited in time and frequency. Hence, for a symbol to be masked, its temporal and spectral width should match the temporal and spectral width of the speech. With rapidly spoken speech, the duration of a phoneme might be extremely short, which limits the temporal and spectral span of a symbol.

In one embodiment, to minimize the bandwidth and duration of a symbol, the symbol should contain only 1 bit of payload information. However, to be decodable, the product of the duration and spectral width of the symbol should be approximately 1. A symbol that is 1 second long may contain one of two sinewave segments that differ by 1 Hz without the decoder losing the ability to distinguish them. A 100 milliseconds symbol may have a bandwidth of at least 10 Hz. The temporal duration and spectral width trade-off matches the masking time-frequency shape of speech; and this shape may change with channel frequency. Spectral masking is weaker at low frequencies, which implies reduced spectral width which implies longer symbol duration.

While having a symbol spectral width and symbol duration that matches the criterion of having a product of 1.0, there are cases where the product should be somewhat larger or smaller to optimize other aspects of the design. The optimum range of the product may be between 0.7 and 2.5. For smaller products, the ability to decode the symbols in noise (such as unrelated sound in the listener's environment) becomes progressively more impaired; for larger products, the channel capacity measured in terms of spectral bandwidth is being wasted, with a corresponding degradation in channel capacity.

While the previous discussion considers masking from the properties of the human auditory system, a more severe criterion appears from the properties of speech and speech-like audio. In this case, masking arises from individual phonemes, which typically have duration of 20-50 milliseconds. To achieve optimal performance, this may also be the symbol duration. Matching symbol duration to phoneme duration produces optimal masking for this type of audio. This duration then defines the range of spectral widths.

There are other reasons to match the temporal-spectral properties of the symbols to speech phonemes. As mentioned earlier, one of the goals is to better match the distance range between the radio source in the listener's environment with the range between that source and the watermark decoder. Ideally the listener and decoder should both succeed or both fail. There are at least two mechanisms that influence the range distance: (a) S/N ratio whereby the noise gets too large and destroys both intelligibility and decode ability, and (b) there is a natural temporal smearing produced by the physical acoustics of the listeners space, which includes spatial reflections from walls, reverberation from enclosed spaces, and dispersion produced by thermal waves which have a non-uniform speed of sound. Spatial acoustics produces temporal smearing such the multiple phonemes and symbols that would have occurred in an ordered sequence now exist simultaneously.

Mapping of a binary value into one of two audio segments, one of which represented a digital 1 and the other represents a digital 0, presents a wide range of choices. However, these choices are not arbitrary because of other constraints required to optimize performance. The pair of complementary audio segments representing the digital 1 and 0 of a symbol might be, for example, (a) two sine wave of different frequencies, (b) a noise burst and an interval of silence, (c) segments that differ in temporal structure, and so on. At this point in the discussion, we need to consider that these audio segments should sound as benign as possible if the masking is not adequate to make them in audible. The segments should also be maximally decodable at the listener's location.

If the pairs of audio segments (representing the binary 1 and 0 of a symbol) have the property that the average value of their product approaches 0, then they are considered orthogonal and maximally separable by the decoder. The symbols should also have uniform energy for the duration of the symbol, be spectrally uniform to minimize the likelihood of having a strong aural signature sound. An example may be white noise or a white noise-like audio segment. Importantly, the two segments should sound the same to the human ear so that the symbol sequences do not become perceptually detectable. Anything that is perceived as being uniform recedes into background without being perceptually prominent. People perceive patterns more strongly than anything constant. If the fragments representing a 1 or 0 sound the same then there is no pattern created by the watermarking payload of data.

The optimum design assumes that some speech may be inadequate to mask symbols at a level required for decoding. For this reason, audible messages should be designed to sound as benign as possible, producing the least amount of perceived degradation.

While the designer can specify the spectral width and temporal duration of a symbol to be optimum, the audio program will de-optimize the results. Consider a symbol designed duration to be 50 milliseconds. That symbol will only have that duration if the masking algorithm allows that symbol to be on for the full duration. Consider a speech segment that provides good masking for 20 milliseconds and then there is silence. The masking algorithm will turn off (or gate off) the symbol during the silence and the actual audio symbol fragment will only have a 20 milliseconds duration, not the 50 milliseconds designed duration. The shortened symbol will be spread in frequency and the symbol fragments of a 1 or 0 may no longer be decodable.

The amplitude of the two audio segments is controlled by the masking algorithm and the process of modulating the amplitude creates spectral smearing, which can dramatically degrade the ability of the decoder to identify the value of the segment. It may therefore be appropriate to hold the amplitude of the symbol constant even though there may be a minor audibility. Masking may not adequately to hide the symbol over its entire duration. Keeping the symbols duration short allows for holding the amplitude constant without the unmasked portion being easily perceived. In the prior art, long symbols became temporally truncated with the limited duration of phonemes. The truncated symbols could not be decoded.

Because the message may be transmitted in multiple channels spread in frequency, the various parameters of the message may be optimally required to be different. For example, a channel at 500 Hz must have a smaller spectral width than a channel at 3 kHz because lower frequencies of the program produce less masking than higher frequencies. With a change in the symbol bandwidth, there must be a change in the symbol duration. In order to simplify the decoding, changes in groups of spectral channels should be integer ratios. For example, if one channel has symbol duration of 30 milliseconds and another has duration of 60 milliseconds then two messages in the latter case will align with one message in the former case. The decoder can analyze over the time of the longest message. Other channels will have multiple messages in that time interval. In some cases, channels may be grouped such that there are only 2 or 3 different durations, and correspondingly 2 or 3 different spectral widths.

Because speech is bursty with many intervals of silence, which turns off the amplitude of all symbols at that time, the messages spread over the channels should be time skewed. For example, at a time when symbol 1 appears on channel 1, symbol 2 appears on channel 2, and symbol 3 appears on channel 3. By skewing the start times of the messages, an interval of silence will not destroy all replicates of a given symbol. When a broad spectrum phoneme of short duration appears (such as the fricative /s/), each channel will have contributed a different symbol.

And finally, error-correcting and error detecting symbols can be added to the message to further allow for correct decoding even under adverse conditions. When error correction is used, additional symbols, not part of the original payload, are added to the message. These redundancy symbols make it possible for the decoder to reconstruct the message even when many symbols are not decoded.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Although the present disclosure describes various embodiments in the context of watermarking station identification codes into the station audio programming to identify which stations people are listening to, it will be appreciated that this exemplary context is only one of many potential applications in which aspects of the disclosed systems and methods may be used.

Figure 1:
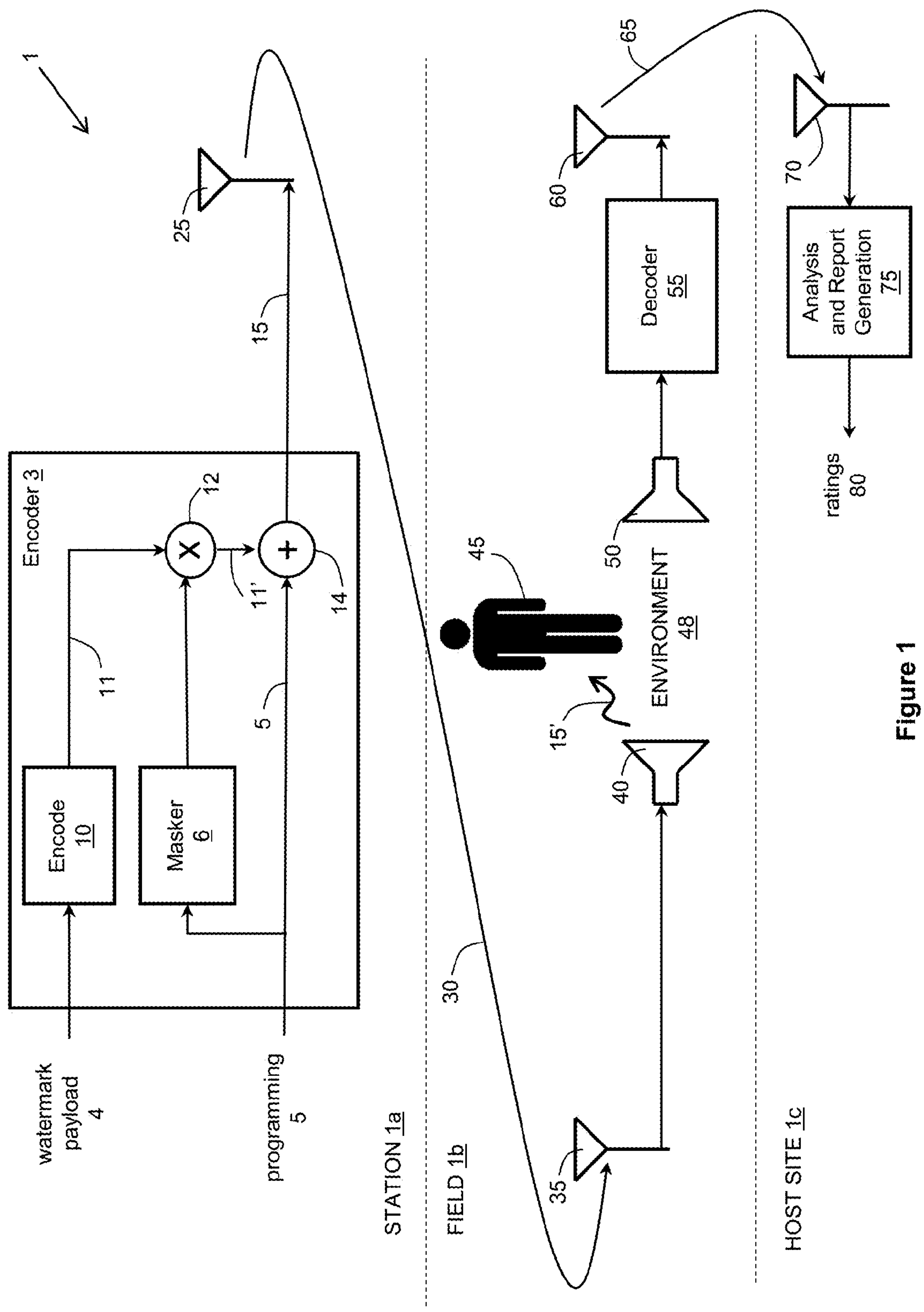
FIG. 1 illustrates a simplified block diagram of an exemplary system for electronic watermarking of audio signals.

FIG. 1 illustrates a simplified block diagram of an exemplary system 1 for electronic watermarking. The system 1 includes at least two portions, a portion at the station 1*a* and a portion at the field 1*b*. The station 1*a* corresponds to the facilities where broadcasting takes place. The field 1*b* corresponds to the places where listeners listen to the broadcast. The field 1*b* could be a home, place of work, car, etc.

The main component of the watermarking system 1 at the station 1*a* is the encoder 3, which includes the masker 6 and the watermarking encode 10. Two signals enter the encoder 3. A digital package of information, called the watermark payload 4, is converted by the encode 10 into a specialized audio watermark signal 11. The encode 10 receives the watermark payload 4 including, for example, the station identification, the time of day, etc. and encodes it to produce the watermark signal 11. The encode 10 encodes this digital information in possibly an analog signal that will be added to the audio programming 5.

But the amount of watermarking that can be injected varies because the degree of masking depends on the programming 5, which may include, announcers, soft-jazz, hard-rock, classical music, sporting events, etc. Each audio source has its own distribution of energy in the time-frequency space and that distribution controls the amount of watermarking that can be injected at a tolerable level. The masking analysis process has embedded numerous parameters, which need to be optimized. The masker 6 receives the audio programming signal 5 and analyses it to determine, for example, the timing and energy of watermark signal 11 that will be broadcasted. The masker 6 may take advantage of perceptual masking of the audio signal 5 to hide the watermark. The output of the masker 6 may also modify the watermark signal to modulate a carrier frequency in the frequency range at which the watermark is to be embedded onto the audio programming signal 5.

The output of the masker 6 is provided to the multiplier 12 and its output is the adjusted watermarking signal 11'. The summer 14 receives the programming signal 5 and embeds the adjusted watermarking signal 11' onto the audio programming 5. The result is the output signal 15, which includes the information in the audio programming 5 and the adjusted watermarking signal 11'. Signal 11' may feed a multiplicity of modulators (not shown) each of which exists on a unique channel frequency. The same watermarking information may appear simultaneously on multiple channels, each of which has its own masker 6 analyzer.

The modulator/transmitter 25 at the station 1*a* broadcasts the transmission 30, which includes the information in the output signal 15, through the air, internet, satellite, etc. The output signal 15 of the encode 10, thus, is a composite signal that has two audio signals sharing the same transmission chain, which includes the transmitter (sender) 25 and, in the field 1*b*, the receiver 35, and a transducer like a loudspeaker 40 that converts the electronic received signal into an acoustic sound signal 15'.

In the field 1*b* an AM/FM radio, television, etc. that includes the receiver/demodulator 35 receives and demodulates the broadcast transmission 30 and transmits a corresponding signal to be transduced by the transducer 40 into the acoustic sound signal 15'. Microphone/demodulator 50 senses the composite acoustic sound signal 15', and decoder 55 extracts some, or all, of the watermarking payload. That information is then sent to the host site 1*c* via a transmission system 60 and a reception system 70 that may be implemented as a radio broadcast 65 or as a telephone or internet transmission. The final result is the published ratings 80.

The decoder 55 receives and decodes the signal 15' to obtain the watermark or the information within the watermark. The decoder 55, which has the responsibility of extracting the watermarking payload, is faced with the challenge of operating in an environment 48 where both the local environmental sounds and the audio program being transmitted may undermine the performance of the decoder 55.

The composite acoustic sound signal 15', which includes the program and the watermarking, has two audiences: the listener 45 for program enjoyment and the decoder 55 for decoding the watermarking. The dual audio components of the sound signal 15', thus, each has its own "receiver." Each component may be corrupted by sound in the environment 48 which can compete with either or both of the human listener 45 and the decoder listener 55. Environmental sounds may make it difficult for the listener 45 to hear the program and/or the decoder 55 to hear the embedded watermarking.

In the system 1, whenever the programming 5 corresponds mostly to speech, masking energy in the programming audio signal 5 may be very limited. Systems for watermarking audio should be optimized such that the limited amount of masking energy available in the speech audio signal may be used to its fullest extent. The central issue takes place in the environment 48 where the two unrelated audio sounds are intended for two different targets: the human listener 45 and the decoder 55. The design of the encoder 3 needs to be optimized such that each of the two targets hears the sound signal intended for that target and only (or at least mainly) the sound signal intended for that target.

Figure 2:
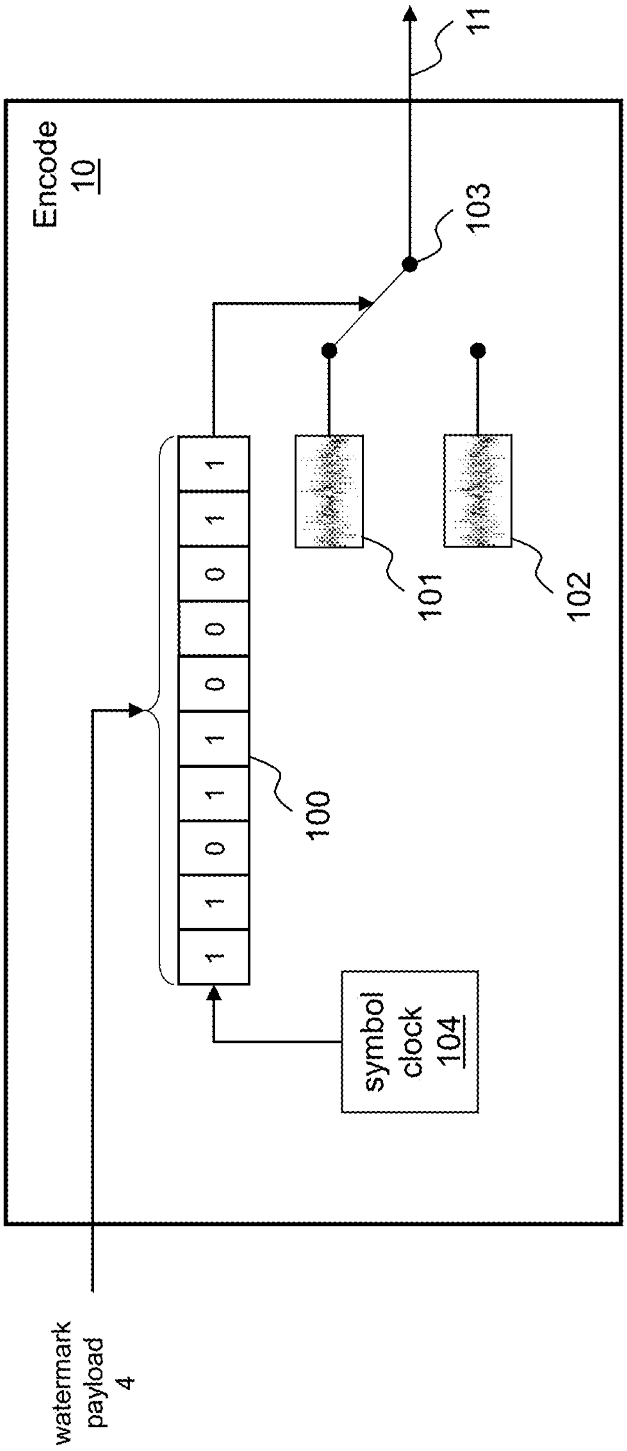
FIG. 2 illustrates an exemplary implementation of an encoder module that converts digital bits into an audio waveform segment.

FIG. 2 illustrates an exemplary implementation of the encode 10 of FIG. 1. At the beginning of a message interval, the watermark payload 4 may be loaded into a shift register 100 or the equivalent. The register 100 is shifted one bit at each symbol clock 104 such that the data advances. The bit controlling selector switch 103 chooses either the digital 1 waveform 101 or the digital 0 waveform 102 depending on the current rightmost bit of the register 100. The switch 103 feeds the chosen analog signal to the encoder output 11. On the next symbol clock 104, the process continues with the next bit in the digital payload 4.

The encode 10, thus, converts information represented as a digital bit sequence into a sequence of analog waveforms such that each waveform corresponds to the bit value of a symbol. The choice of analog waveforms to represent the digital payload bits, and the choice of parameters in the encoding process are important to the disclosed invention and will be discussed later. In a simple example of symbols, the 1 of a bit may be represented as a sine wave and the 0 as the same sine wave shifted 90 or 180 degrees, for example, or the 1 and 0 could be represented as two sine waves of different frequencies. The analog representation in the symbol could also be complementary pseudo-random noise segments.

Returning to FIG. 1, in the watermarking system 1, the encode 10 encodes data bits in the watermark payload 4 and thus transforms it into symbols that form the signal 11. These symbols may then be inserted into the main audio signal 5. The collection of all of the symbols for each bit in the watermark payload 4 becomes the payload message as an analog signal. Thus, in the watermarking system 1, there are two separate modules: the encode 10, which produces audio waveform symbols, and the masker 6 implementing the psychoacoustic model that controls the amplitude and location (time and frequency) at which the payload symbols are inserted. Throughout this disclosure we will refer to these locations in the audio signal as spectral channels, two-dimensional units having a time duration and a spectral width in which one or more symbols may be inserted.

Figure 3:
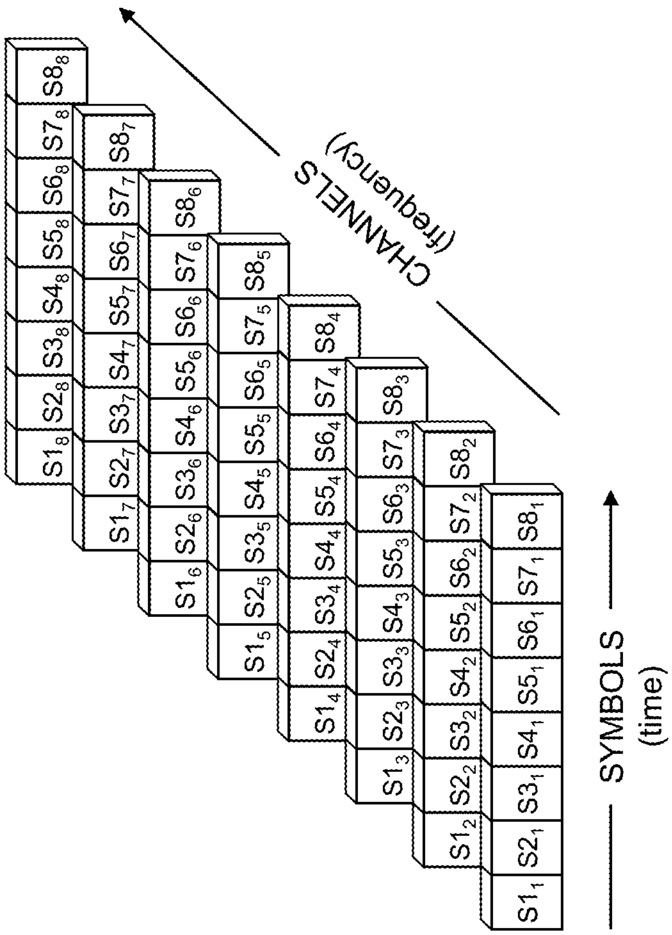
FIG. 3 illustrates an exemplary message structure composed of eight symbols to create messages in each of eight spectral channels.

FIG. 3 illustrates eight spectral channels each of which has a symbol waveform sequence representing the digital payload. FIG. 3 illustrates the assembly of symbols into multiple messages across a multiple of spectral channels. $S1_1$ is the first symbol in message 1, $S2_1$ is the second symbol in message 1; $S1_2$ is the first symbol in message 2, and so on. In this illustration $S1_1$ and $S1_2$ both represent the same first bit of the payload but they can be different waveforms and they exist in different spectral channels at different frequencies. Not shown in this figure is that at the end of each message, the cycle repeats with the same message being sent again and again. The meaning of each symbol varies with the implementation. In some application a group of symbols may represent a static station ID value and other symbols may represent a time code that changes each minute. In other applications some symbols may be error correcting information or the name of the program being broadcast.

Figure 4A:
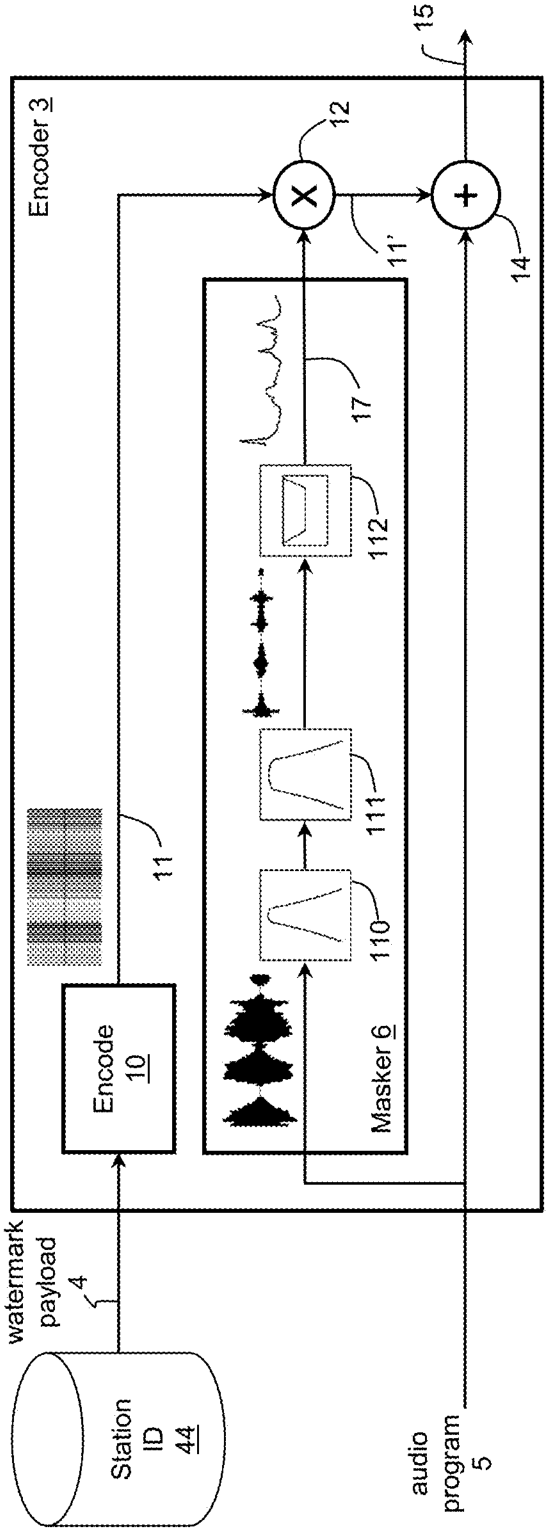
FIG. 4A illustrates details of the encoder of FIG. 1.

FIG. 4A illustrates details of the encoder 3 showing how the masking power of the audio program 5 is used to control the amplitude of the symbol waveforms. In this exemplary illustration, the masker 6 includes, per each spectral channel, a channel filter 110, a band pass filter tuned for the specific channel. The filter 110 extracts a narrow band filtered part of the program in the region of the spectrum for channel 1, for example. There would be a corresponding channel filter 110 for each spectral channel.

The masker 6 also includes the masking filter 111, which models the human auditory cortex to determine which parts of the audio spectrum would be masked by the program 5. Masking is the property of the auditory system in which a loud sound makes the ear temporarily deaf to other parts of the audio signal that are nearby in time and frequency. Components modestly above and below a target signal such as a musical note are inaudible; similarly, components that appear just before and after the loud sound are similarly inaudible. Masking filter 111 creates a signal output that models this temporary deafening. Envelop detector 112 creates a signal 17 that represents the threshold below which there is no audibility.

The multiplier 12 continuously changes the amplitude of the symbol waveforms to stay under the masking threshold 17. While represented as amplitude scaling, multiplying two signals in 12 changes the spectrum of the symbol waveforms 11 resulting in 11'. This process is AM (amplitude modulation) even if considered as just amplitude scaling. The implications of this modulation process are explored below.

The central issue is that the time-spectral statistics of the audio program have a strong influence on the robustness of the symbols, which then influence the ability of the decoder 55 to extract the payload from the messages. The invention disclosed herein optimizes the design to handle the worst case of speech and speech-like audio signals, which are very non-stationary with bursts of masking and long interval of non-existent masking. The bursty program shortens the symbols such that prior art decoders may fail to detect the value of the symbol.

Figure 4B:
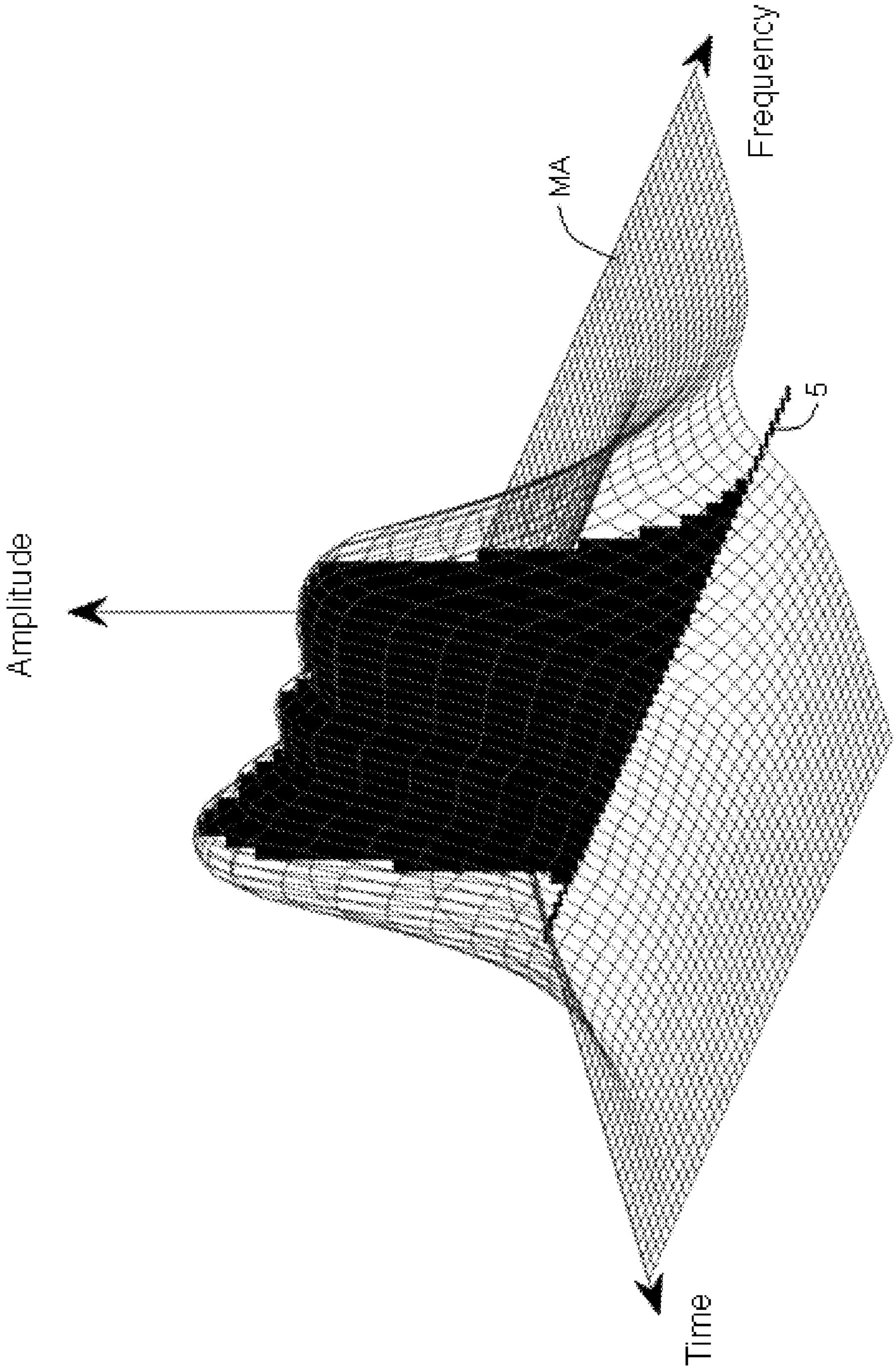
FIG. 4B illustrates an exemplary relationship between time-frequency spectra of a program's audio signal and a corresponding masking algorithm.

FIG. 4B illustrates an exemplary relationship between time-frequency spectra of a program's audio signal 5 and a corresponding masking algorithm MA. The figure shows a hypothetical segment of audio 5 as a vertical block of energy and a hashed masking envelope MA below which other audio components are inaudible. Under the envelope MA, other audio components at the appropriate time and frequency will be inaudible. The program's audio signal 5 is represented as the vertical rectangular block with a well-defined start and stop time, as well as a high and low frequency. The corresponding masking curve MA in the same time-frequency representation determines the maximum added watermark energy that will not be audible. Masking is represented by the envelope grid MA, under which the human ear cannot detect a signal.

Figure 5A:
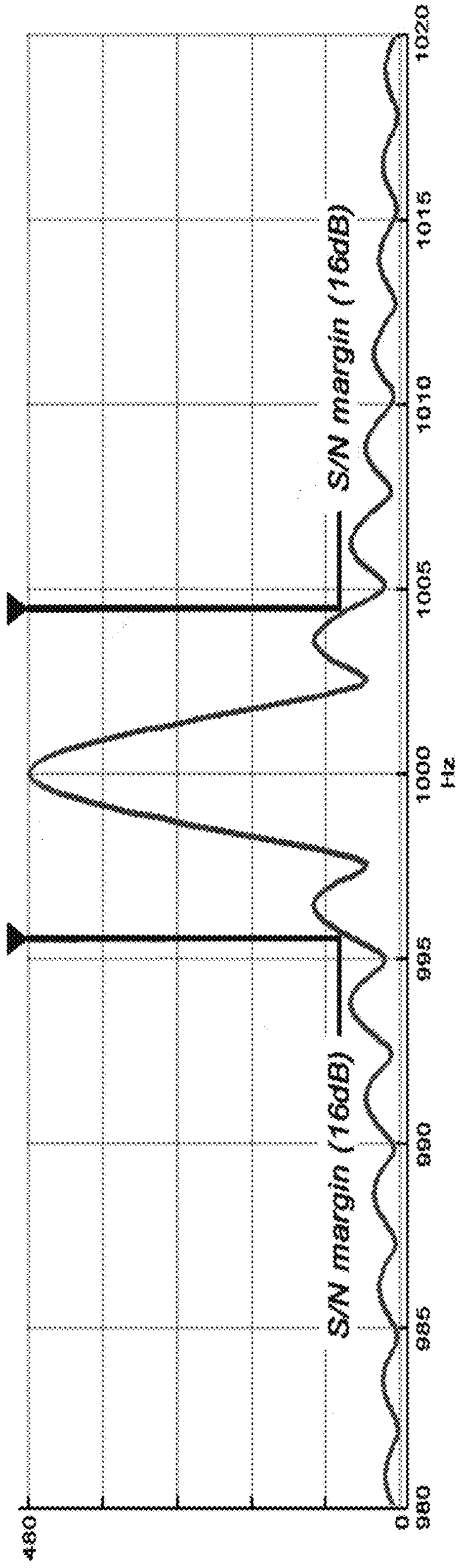
FIGS. 5A, 5B, 5C illustrate the spectrum of a symbol of varying durations.
Figure 5B:
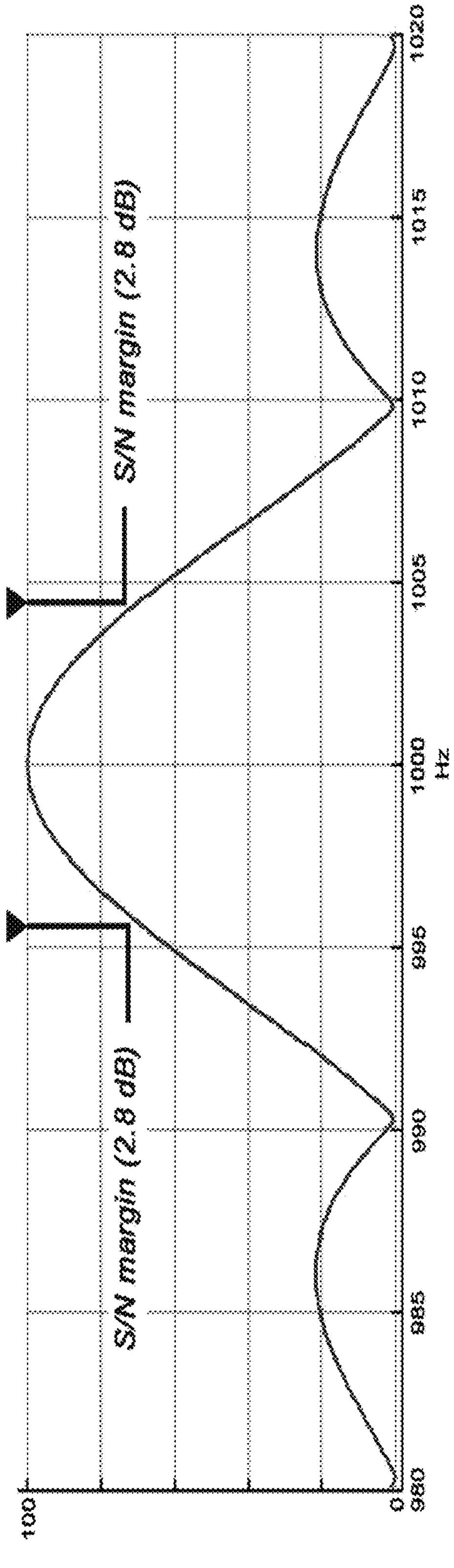
Figure 5C:
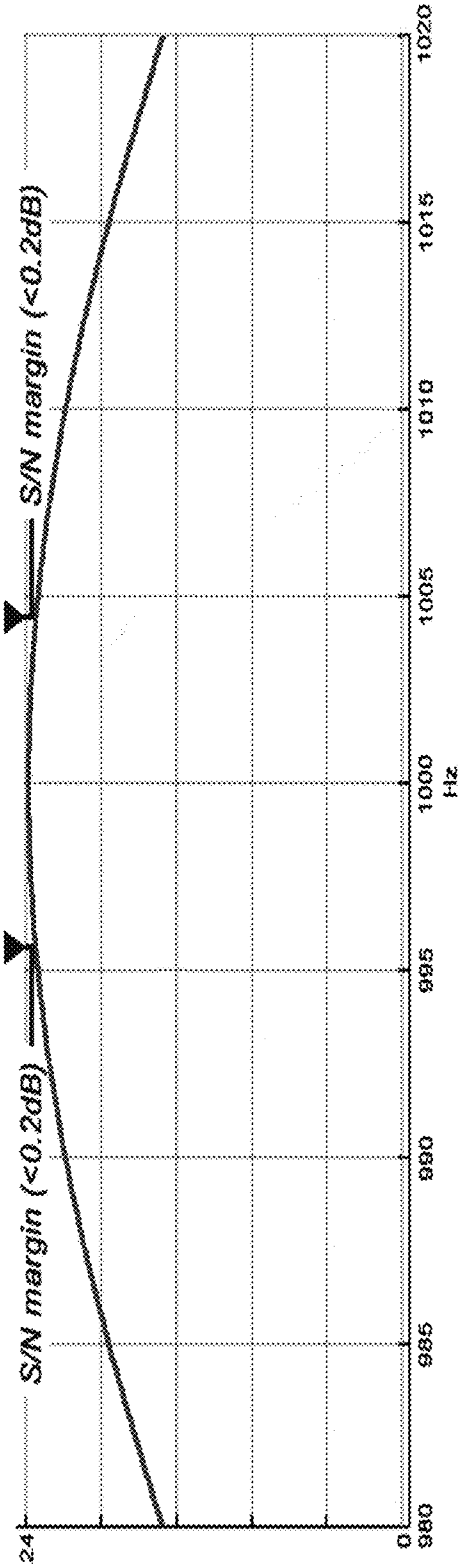

FIG. 5A-C illustrate how the temporal truncation of a symbol by the masking process dramatically changes its spectrum, which then dramatically changes the decoder's ability to distinguish a 1 from a 0. In these illustrations, we will represent the digital 1 and 0 as being waveform segments of a sinewave at two different frequencies, namely 1000 Hz and 1005 Hz with a nominal symbol duration of 400 milliseconds. This analysis is valid for any pair of waveforms that are selected from an orthogonal basis set, such as a bandpass filtered pseudo-random noise burst and a matching noise burst that is derived from a Hilbert filter.

FIG. 5A shows the spectrum of a symbol represented by a 400 milliseconds sinewave at 1000 Hz and with the assumption that the masking control 17 is relatively constant for the duration of the symbol. Such might be the case for an organ note that lasts 1 second. If that organ had high overtones, it would produce masking between the overtones that would be continuous. Notice that the spectrum of this symbol is very narrow, perhaps 2 Hz which corresponds to the 400 milliseconds duration. It would be easy for the decoder to identify this symbol waveform as being 1000 Hz and not 1005 Hz or 995 Hz. The S/N margin at the decoder is 16 dB. It would take a relatively high environmental noise of 16 dB in this spectral region to produce confusion between the 1000 and 1005 Hz binary pair of sinewaves.

FIG. 5B shows what happens if the masking control shortens the symbol to 100 milliseconds. Shortening would happen if the audio program only had masking power for this shorter duration. Even though the unmasked symbol is 400 milliseconds, the signal leaving the encoder would be truncated to 100 milliseconds in this illustration. This shortening process spreads the spectrum of the symbol from 2 Hz to 10 Hz, and the peak amplitude is reduced from 480 to 100 relative units. The S/N margin has been reduced from 16 dB to about 3 dB. Environmental noise might easily result in the decoder making an error.

FIG. 5C shows what happens when the masking control shortens the symbol to 25 milliseconds, which might be the case for bursty speech, illustrated later. The peak amplitude of the symbol waveform has been reduced further to 25 units, and the spectrum has spread over 40 Hz. The corresponding S/N margin approaches 0 (shown as less than 0.2 dB). It is theoretically not possible for any decoder to determine if the symbol was a 1 or 0.

The conclusion is clear: the time-frequency content of the audio program dramatically influences the ability of the decoder to determine the payload if the watermarking design does not take into account the relationship of the program statistics to the watermarking robustness. For most music, the masking does not dramatically truncate the symbol duration; but for difficult speech, the symbol duration will often be truncated to the point of being useless.

Figure 6A:
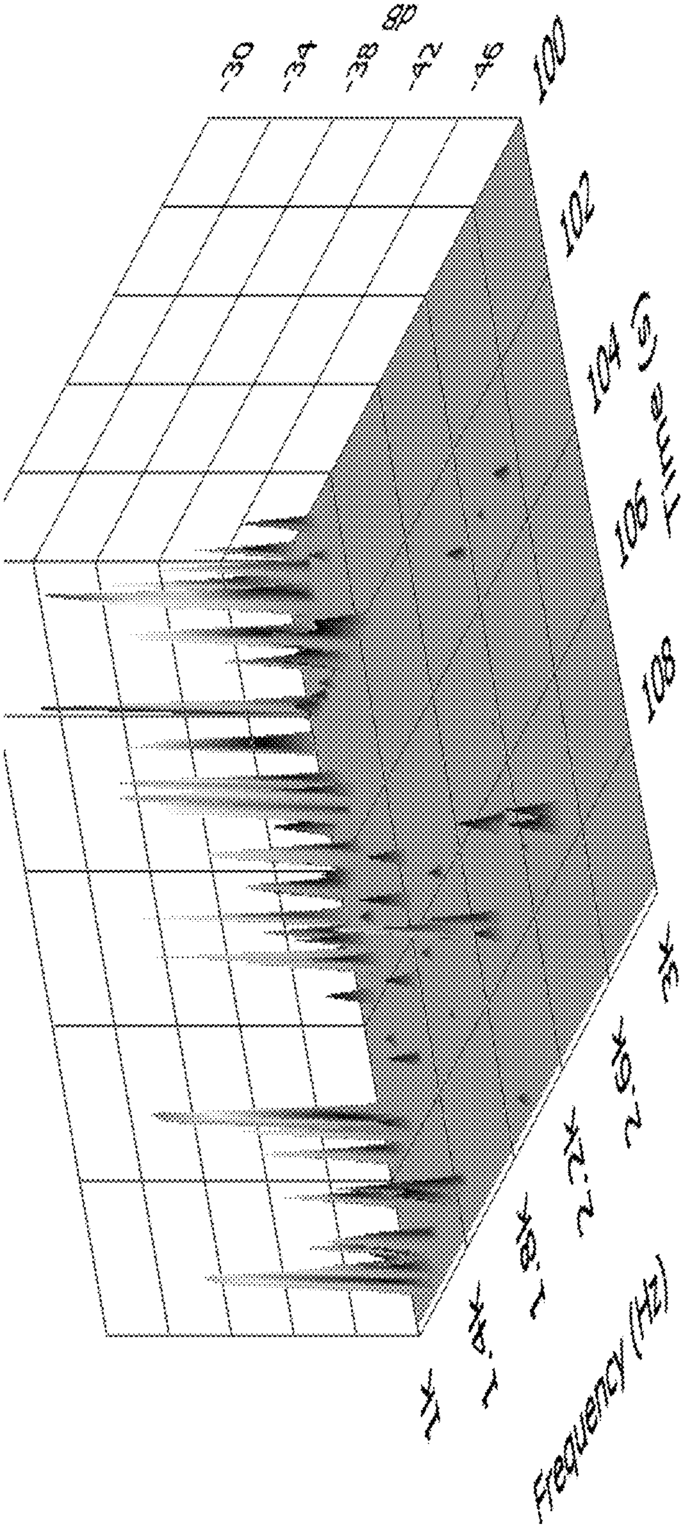
FIG. 6A illustrates the time-frequency map of a difficult speech segment.

FIG. 6A shows a time-frequency spectrogram from a real world example of a famous male announcer syndicated through the U.S. He has a large audience following but his audience ratings are minimal. For the current prior art of watermarking, the inconsistency between ratings and reality is clearly shown in this spectrogram. This is a 3-dimensional picture of time, frequency and amplitude, so called waterfall spectrogram. To appreciate what the masking system does, consider a vertical line from left to right corresponding to one of the possible spectral channels, whose responsibility is to deliver a message with the digital payload. As time progresses along the right-bottom axis, the masking filter sees bursts where there is strong masking, but those bursts are of very short duration, often corresponding to the spectrum of watermarking shown in FIG. 5C. Even the lowest frequency channel at 1 kHz is very bursty. The prior art watermarking system, which is widely deployed worldwide, will fail for this kind of speech program.

Figure 6B:
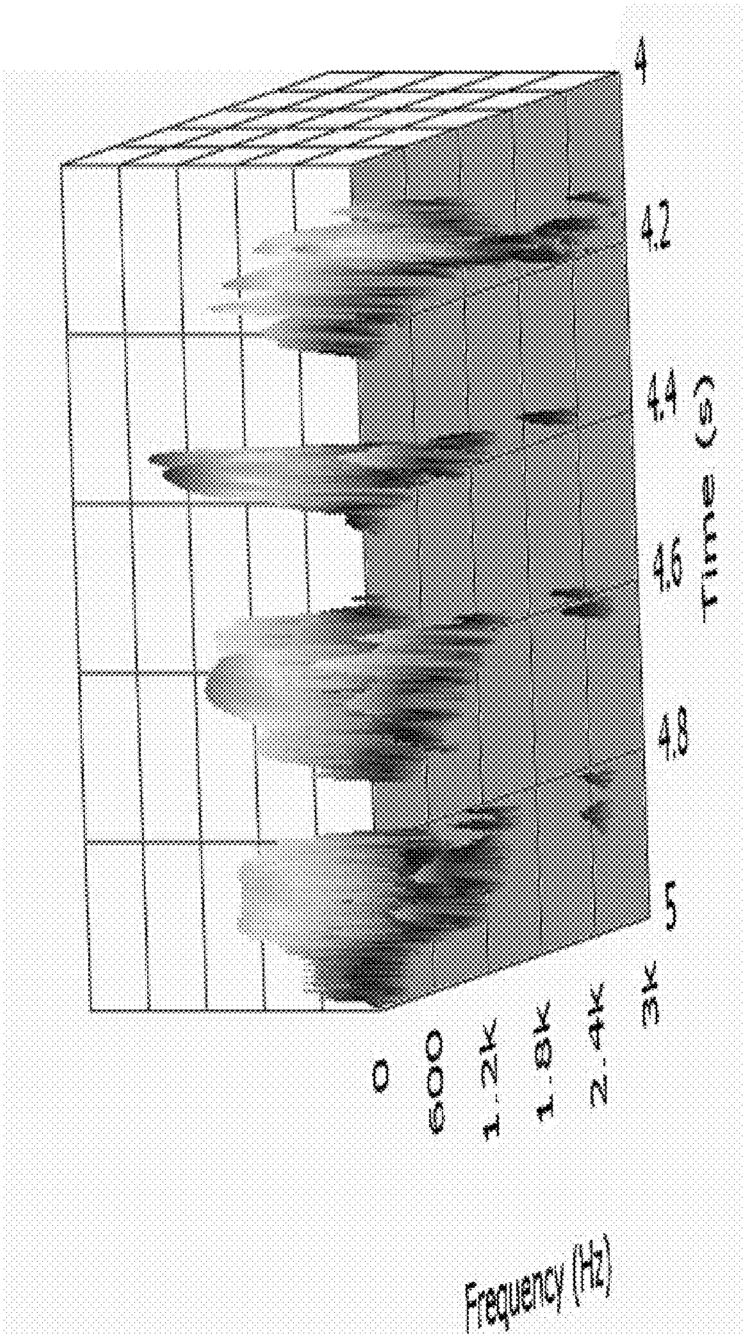
FIG. 6B illustrates a zoomed in view of the time-frequency map of FIG. 6A.

FIG. 6B shows a zoomed in version of the spectrogram of FIG. 6A. One can see the individual phonemes and one can see, using a horizontal line, that the masking filter produces a very chopped masking signal that controls the AM modulation of the watermarking channels, even at low frequency channels. These two FIGS. 6A and 6B) illustrate the unrecognized defects in prior art watermarking systems.

Figure 7:
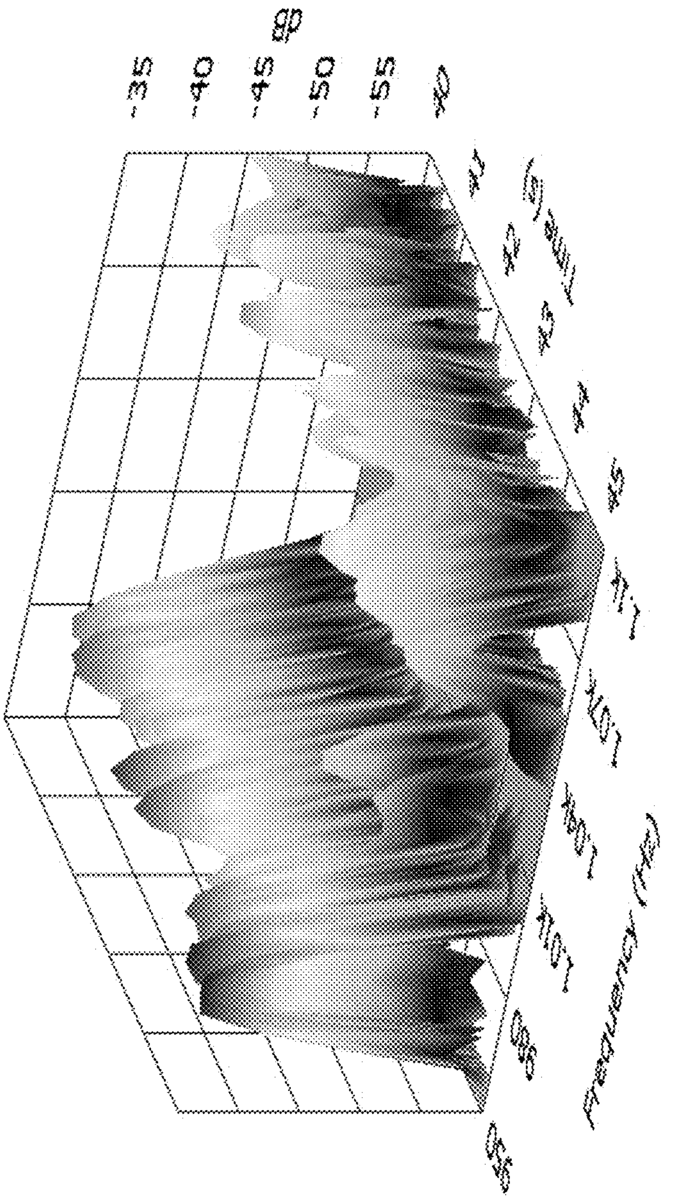
FIG. 7 illustrates the time-frequency map of a robust audio signal.

FIG. 7 illustrates why the prior art watermarking systems may be adequate for typical music signals. In this time-frequency waterfall spectrum, we can see a masking valley for a channel at 1.035 kHz. This is a segment from a Buxtehude organ concert with an organ note that last for more than 5 seconds, and it has two strong overtones that will mask all symbols in a message that are injected at a channel between these two overtones. But this is the best case scenario. The watermarking technology must embody a model that reflects the variety of audio program statistics ranging from best case to worst case.

With speech, the duration of a stable spectral channel having enough energy to mask a symbol is often extremely short (perhaps as small as 10 or 20 milliseconds). This is in contrast with music in which such elements may be on average an order of magnitude larger (e.g., 200+ milliseconds). Vibrating strings, membranes, and spatial reverberation (which are often part of music) produce long duration sound elements. This then allows for relatively generous spectral channels in which to insert symbols in the payload. That is not the case for speech.

Figure 8:
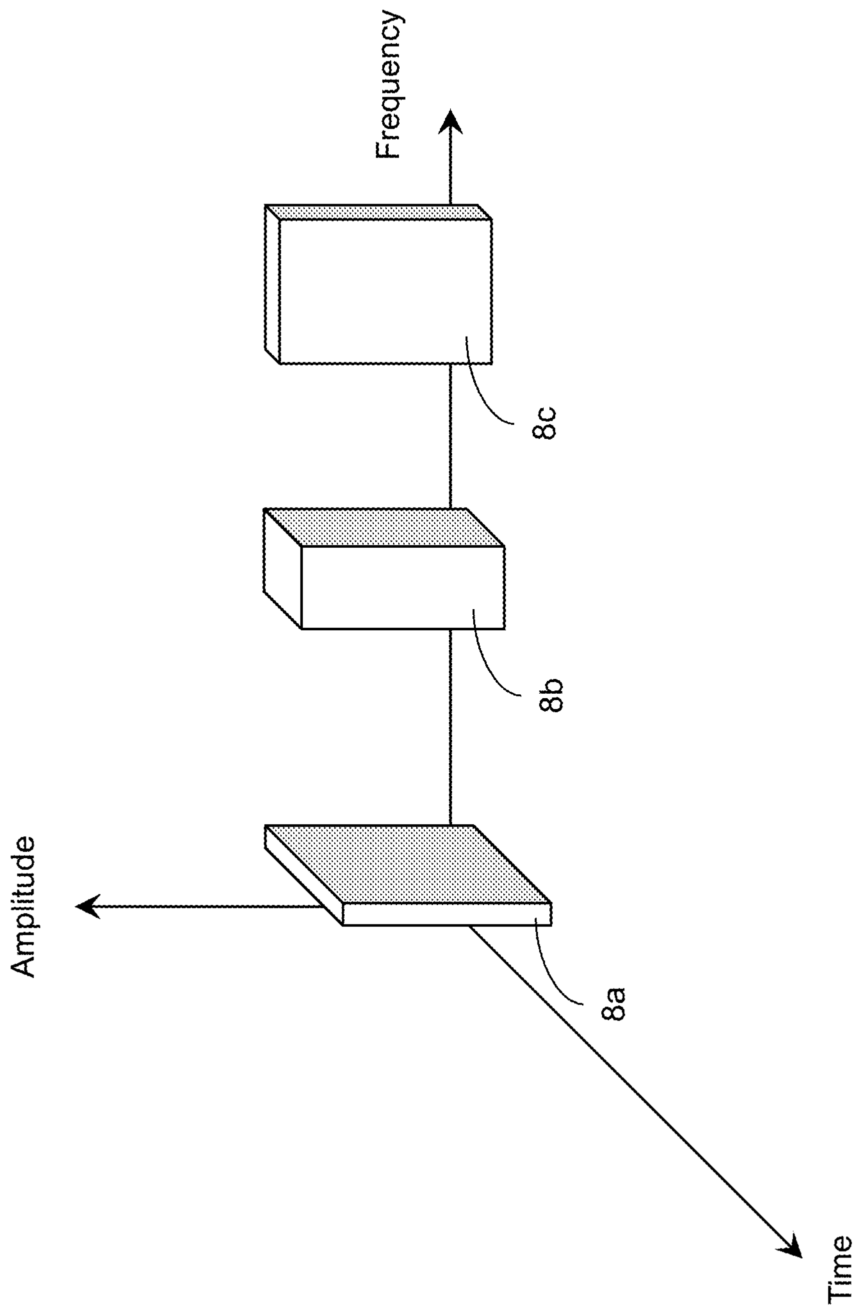
FIG. 8 illustrates symbols with different spectral width and temporal duration.

FIG. 8 shows three possible representations 8*a*, 8*b*, and 8*c* of a symbol. Each of the three example symbols in FIG. 8 can carry 1 bit of information. A symbol must be as narrow as possible in frequency, to accommodate masking, and to be as short duration as possible in time, to accommodate the bursty nature of speech masking. Hence each symbol contains only 1 bit to minimize both temporal duration and spectral width. However, that still leaves the choice of the two parameters. The product of the spectral width and temporal duration determines the robustness against noise, while still preserving the ability to decode the bit. For discussion, assume that a time-frequency product of 1 is adequate for the degree of noise robustness. The requirement to handle bursty speech with its phoneme duration that is on the order of 20 to 50 milliseconds, implies the duration of the symbol. Using 30 milliseconds as the duration, we are then left with a spectral width of 35 Hz.

Contrast this with the prior art represented by the Arbitron-Nielsen PPM watermarking system, which has been the dominant system used in US radio broadcasting. It uses 4 bits for a symbol that has a duration of 400 milliseconds. A single bit has the equivalent bandwidth of 4.5 Hz since the channel width is 65 Hz. There are 16 possible representations for a symbol waveform. Such a system, which is very widely deployed, will simply not work for speech because symbols are temporally truncated and the spectral width of a symbol is spread such that the frequency of a given symbol cannot be determined.

The present disclosure proposes a system in which each symbol contains only 1 bit to minimize both temporal duration and spectral width. For a single bit, the time-frequency product may be on the order of 1. For example, a symbol of 20 milliseconds time duration and 50 Hz bandwidth is equivalent to a symbol of 200 milliseconds time duration and 5 Hz bandwidth. Information-wise these two symbols are equivalent but, in the speech context, they are very different. Spectrally wider symbols are more difficult to mask in frequency, and temporally longer symbols are difficult to mask in time. Moreover the masking power of the speech audio signal depends on the frequency region. At low frequencies (e.g., below 500 Hz), the speech audio signal may allow for longer duration but narrower bandwidths. Hence, optimization of the watermarking may depend on the frequency of the spectral channel.

In the illustrated embodiment of FIG. 8, each of the multiple spectral channels has the same bandwidth x time duration product. In one embodiment, all of the multiple spectral channels have the same bandwidth x time duration product of 1. In one embodiment, above 1 kHz, the time duration may be 20 milliseconds and the bandwidth may be 50 Hz, whereas for frequencies below 1 kHz, the time duration may be 200 milliseconds and the bandwidth may be 5 Hz.

In the time-frequency spectra of speech there may be a significant number of places where the speech is stable for these kinds of durations and widths. In fact, speech may have the highest information carrying capacity in the range from 600 to 800 Hz range. Spectral regions outside of this range may still be useful, however. In one embodiment, a channel allocation range may be from 600 to 800 Hz, while, in another embodiment, the channel allocation range may be from 500 to 1500 Hz, while, in yet another embodiment, the channel allocation range may be from 600 Hz to 1000 Hz.

With, for example, a channel allocation range from 600 Hz to 1000 Hz for carrying the watermarking, and with symbols having an average width and time duration of 40 Hz and 25 milliseconds, respectively, this range can carry 10 independent spectral channels. Depending on the actual speech content (i.e., the masking energy), only some of the channels may be active. Channel capacity is rapidly changing as the speaker talks. These 10 channels could deliver 400 bits per second or 24,000 bits per minute. If the requirements on the payload size were, for example, 200 bits per minute, which may be typical of such applications as radio watermarking, the system would have massive redundancy and more than enough capacity for error correction. All of the channels could replicate each other. And only a few would need be present at any given time.

Thus, the audio signal is set to include multiple spectral channels, each spectral channel corresponding to a different frequency region. In one embodiment, the multiple spectral channels are located in a frequency region between 500 Hz and 1,500 Hz. In another embodiment, the multiple spectral channels are located in a frequency region between 600 Hz and 1,000 Hz. In another embodiment, the multiple spectral channels are located in a frequency region between 600 Hz and 800 Hz. In other embodiment, the multiple spectral channels are located in frequency regions different from between 500 Hz and 1,500 Hz, between 600 Hz and 1,000 Hz, or between 600 Hz and 800 Hz.

In one embodiment, the first one of the multiple spectral channels is set to have a bandwidth of 50 Hz and a time duration of 20 milliseconds and the second one of the multiple spectral channels is set to have a bandwidth of 5 Hz and a time duration of 200 milliseconds. In another embodiment, the first one of the multiple spectral channels is set to have a bandwidth of 40 Hz and a time duration of 25 milliseconds and the second one of the multiple spectral channels is set to have a bandwidth of 4 Hz and a time duration of 250 milliseconds. In other embodiments, the first one of the multiple spectral channels is set to have a bandwidth different from 40 or 50 Hz and a time duration different from of 20 or 25 milliseconds and the second one of the multiple spectral channels is set to have a bandwidth different from 5 Hz or 4 Hz and a time duration different from 200 milliseconds or 250 milliseconds.

Figure 9A:
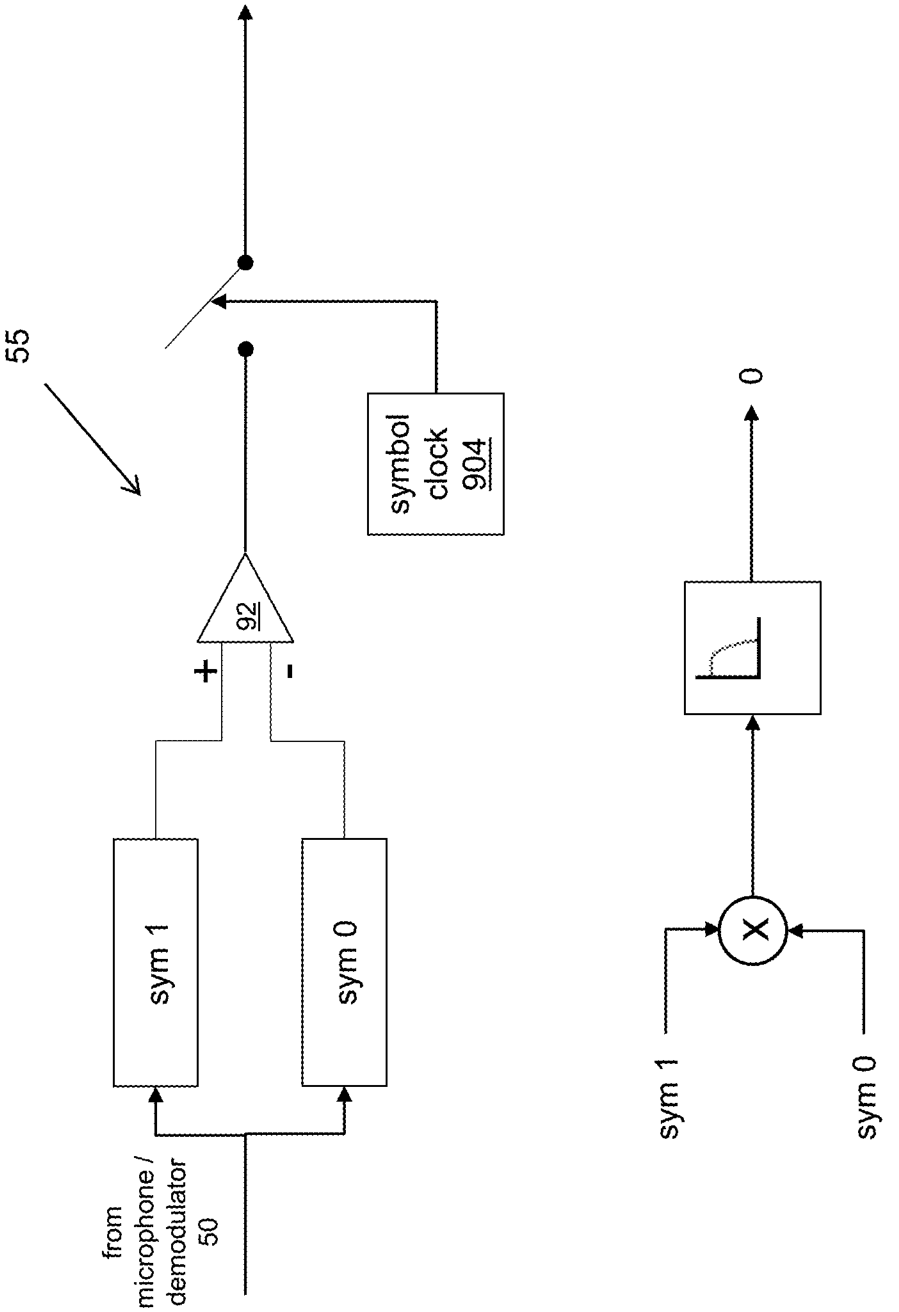
FIG. 9A illustrates attributes of orthogonal pairs of symbol signals.
Figure 9B:
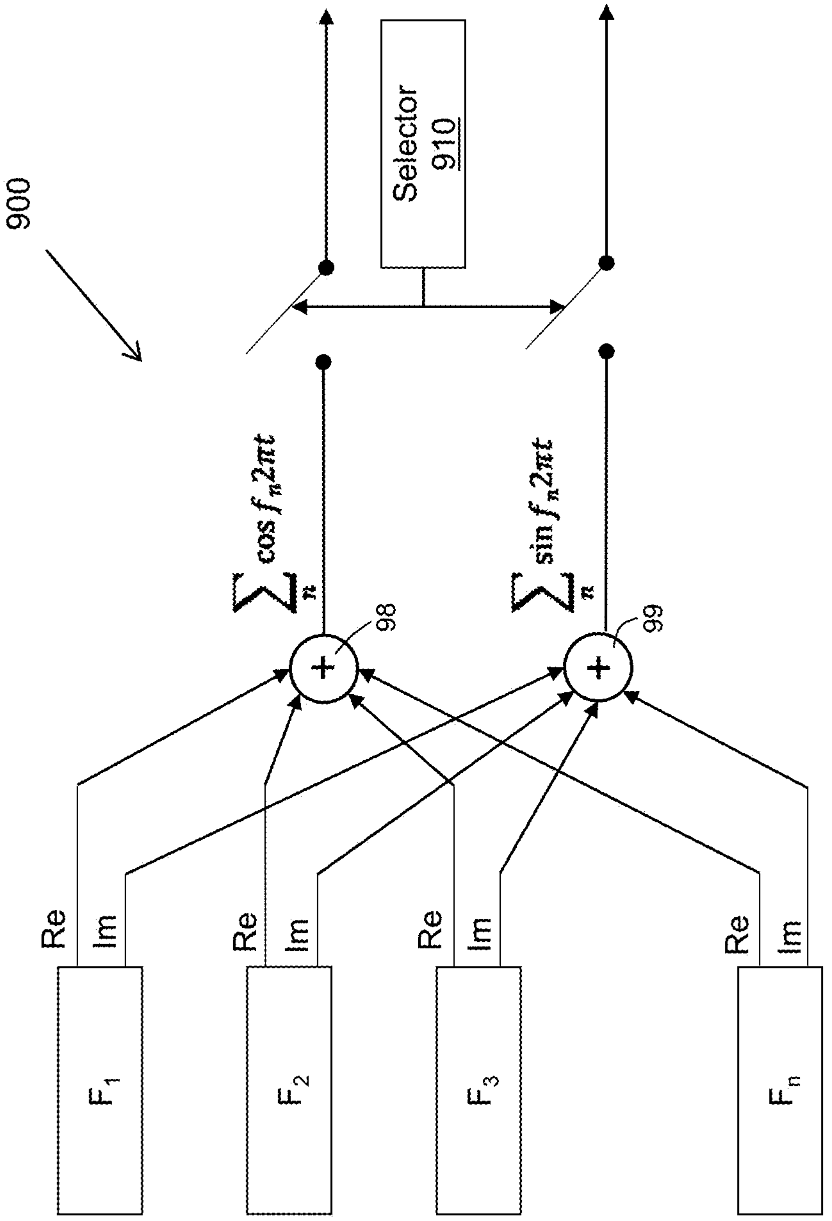
FIG. 9B illustrates an exemplary system for generating a pair of 0 and 1 symbol signals.

FIGS. 9A, 9B and 9C illustrate a machine for creating a pair of binary symbol waveforms to satisfy additional requirements. A potential choice for a symbol is one of two sinewave frequencies. There are many other choices for symbol waveforms such that they are maximally distinguishable. Mathematically, the two waveforms should be orthogonal, and hence decodable with a matched filter. Said filter has an impulse response that is the time reversed signal of a symbol. Hence, there would be two such matched filters.

FIG. 9A illustrates matched filters sym 1 and sym 0 that can be used to detect which symbol exists at a given time. In this embodiment, the decoder 55 processes the signal from the microphone/demodulator 50 via two filters sym 1 and sym 0, each of which has an impulse response that is time reversed versions of the symbol waveforms. Comparator 92 compares the two outputs of the filters sym 1 and sym 0. If the actual symbol wave form is Sym1, then the top filter will produce an approximation to an impulse while the bottom filter will approximate 0. The comparator 92 can then select the filter output with a maximum, and this is sampled by the symbol clock 194 at a time midway through the symbols (after compensating for filter delays). The lower part of FIG. 9A shows an implementation for demonstrating orthogonality of two symbols. When the product is averaged, the result approaches 0.

There are millions of pairs of symbols that are orthogonal. The additional constraint in selecting symbol waveform pairs is that they should be perceptually benign to a human listener. While masking makes the audibility of these symbols nominally irrelevant, complex program signals may not be able to completely mask the symbols. Moreover, since the messages repeat, the auditory system can easily latch on to the repeating pattern of consistency, which is undesirable. Hence, to be tolerant to inadequate masking and repeating patterns, the symbols should not be perceptually disturbing. Ideally, the pair of symbols should be equivalent to background noise, and the two symbols should be perceptually identical. A continuous stream of symbols should sound constant.

FIG. 9B illustrates a machine 900 for creating such symbols. Consider n complex sine wave oscillators $F_1$, $F_2$, $F_3$ . . . , $F_n$ each with a random frequency between the channel limits. For example, with a 60 Hz width and with 100 random oscillators, the sum (at 98 and 99) of these will be a random narrow band noise signal. If each oscillator F generates both a sine wave and cosine wave, we can form two sums. These two signals are always orthogonal and hence distinguishable. This implementation produces a continuous signal. By selecting a small segment of this continuous waveform, we can extract a sample that happens to have relatively constant amplitude. The selector 910 extracts say 40 milliseconds regions of the two signals that have relatively constant amplitude. These two signals samples are orthogonal. And orthogonality is preserved even if the symbol duration is truncated by inadequate masking.

To summarize the above discussion consider the following: Symbol1 & Symbol2 are a binary pair of waveforms representing a digital 1 and digital 0 for a symbol. For example, channel 1, spanning the frequency from 1.000 to 1.050 kHz, has a 50 Hz width. Select a large number of complex oscillators F spread randomly over this 50 Hz interval to create a uniform energy over frequency. Each oscillator F has a sine and cosine output; sum (at 98 and 99) the set of oscillator outputs for the real and imaginary parts, which creates a continuous pseudo random pair of signals that is always orthogonal and hence maximally detectable. This is equivalent to a Hilbert filter on a real random source but easy to control for optimization when discrete. Resulting symbols retain the orthogonality even if the amplitudes are modulated by the masking filter envelope or truncated because the audio disappears. Scan the continuous signal looking for a region that is relatively constant in amplitude and further process with an automatic gain control (AGC) that creates constant amplitude over the symbol duration. The resulting pair of symbols are uniform in frequency, uniform in amplitude, maximally orthogonal, and sound constant to a listener, thereby not having any perceptual patterns even though the digital information can be extracted by a matched filter.

Figure 10:
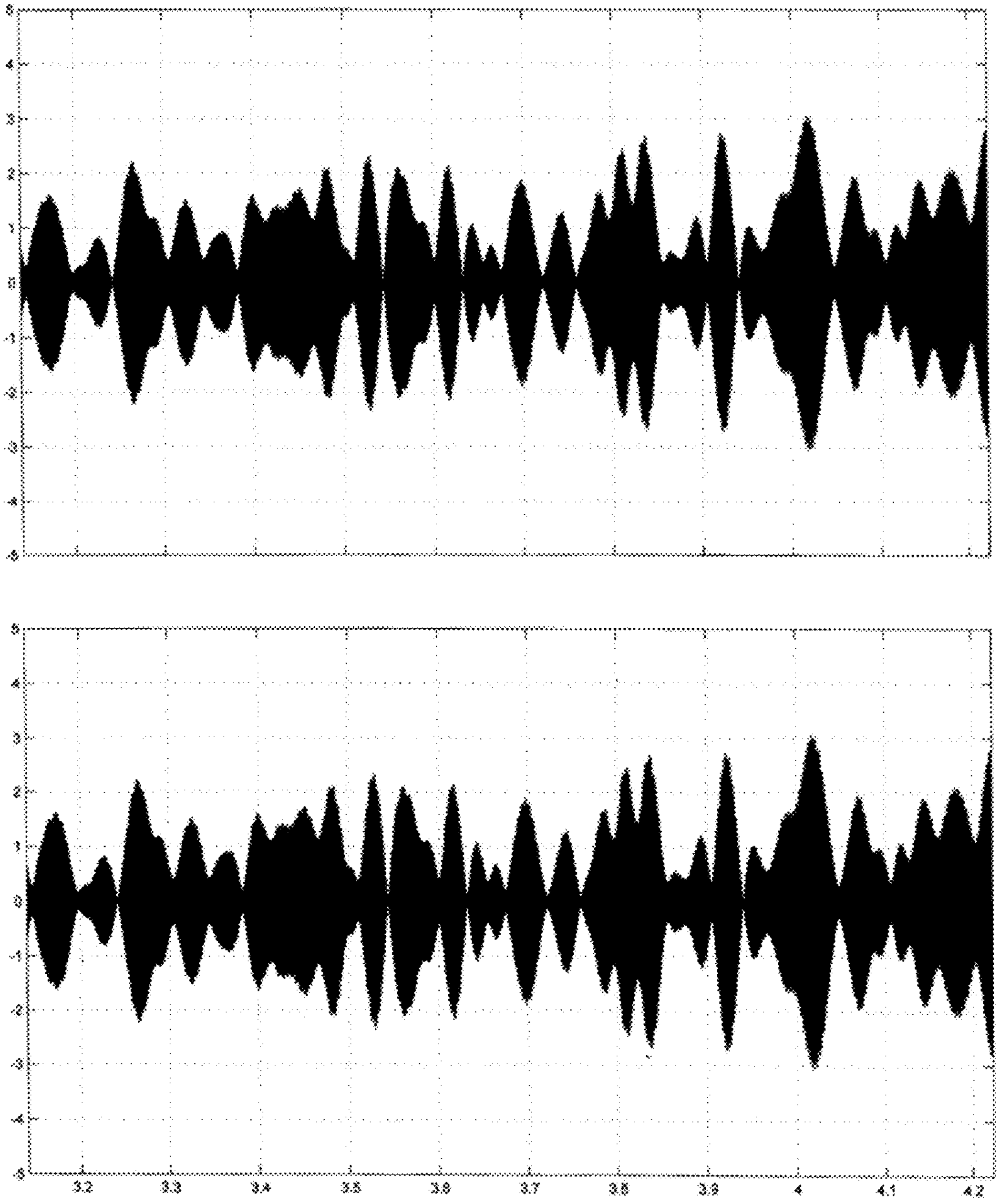
FIG. 10 shows the wave forms for orthogonally created signals.

FIG. 10 shows the continuous signals created by the machine of FIG. 9B. Notice that the two signals look equivalent and they will sound equivalent to the human ear. The envelope of this signal is exactly what one would expect from a narrow band filtered white noise. However, unlike a real white noise, this process creates a pair of signals. Parenthetically, real white noise and a Hilbert filter could be made equivalent to the means described in FIG. 9B for creating a pair of orthogonal symbol waveforms.

Figure 11:
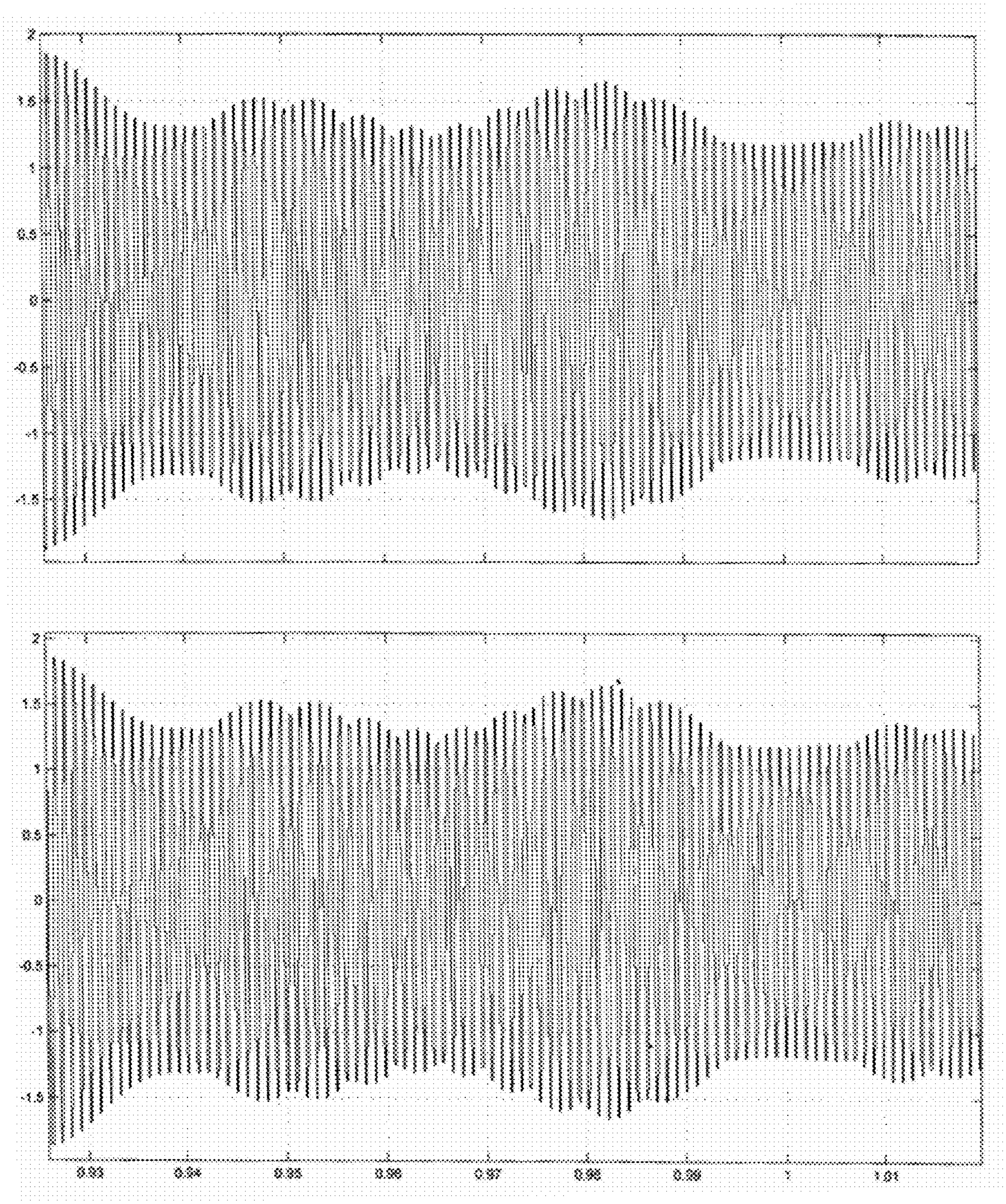
FIG. 11 shows the waveform details of a pair of orthogonal signal symbols.

FIG. 11 shows the exact waveform of the pairs of symbol waveforms created by the machine of FIG. 9B and extracted by the machine of FIG. 9A. The time reversed signal would be the impulse response of the matched filter used in decoding (not shown). Even if the masking algorithm truncated these 80 milliseconds waveforms to 40 milliseconds, they would still be detectable although not as noise immune as the full duration symbols. Any partial symbol would still be orthogonal. This approach for symbol creation means that the orthogonality property is uniformly spread in the symbol.

Figure 12:
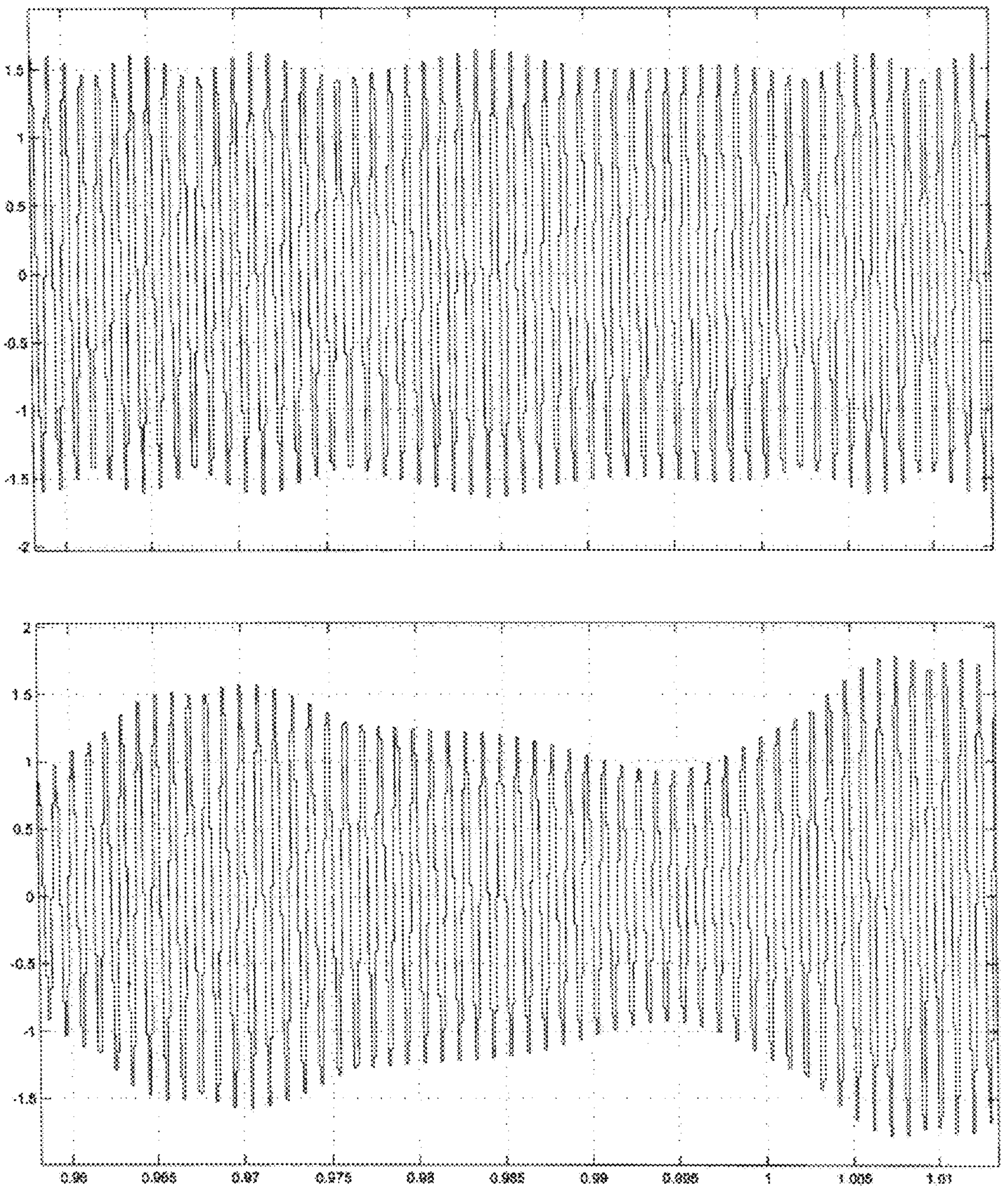
FIG. 12 shows the before and after for AGC symbols waveforms.

FIG. 12 shows that these two symbols can be further processed to make the amplitude more uniform. The lower part of FIG. 12 is the symbol created by the machine of FIG. 9B, and the upper part is that symbol after being processed by an automatic gain control that smooches the amplitude (not shown). With enough processing, the energy becomes uniformly spread over the symbol duration. This is equivalent to creating the symbols using a randomly phase modulating process. The randomization is carried by the phase not the amplitude.

Figure 13:
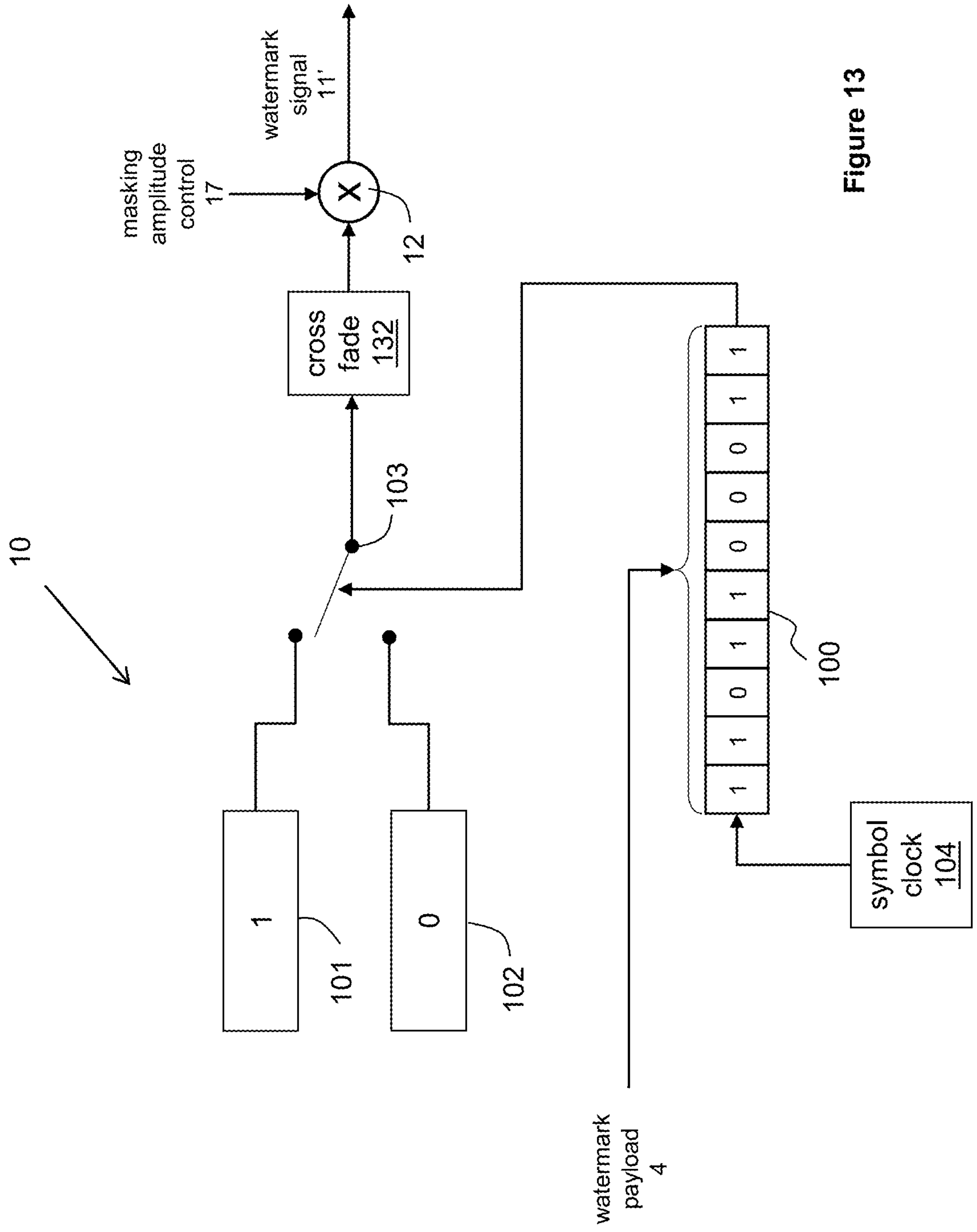
FIG. 13 shows the sequencing of symbols to construct a message.

FIG. 13 shows how the symbol sequence can be created using these binary pairs to produce a full message. While symbols can be spliced, said splices are more audible. A better choice would be to cross fade 132 between neighboring symbols in the message. Symbols that are to be 50 milliseconds long may have a stored value of 60 milliseconds. There is thus a 10 milliseconds overlap which can be used for the cross fading, gradually reducing the amplitude of the target while gradually increasing the amplitude of the next symbol in the sequence. The 10 milliseconds overlap region is when the cross fade 132 acts. The gain profile of the cross fade 132 could be linear or a raised cosine.

Because the message sequences can only be four transition sequences (i.e., 0-0, 0-1, 1-0, and 1-1), multiple pairs of symbols may be selected in order to select those that have the most perceptually uniform perceptual quality. Since there is no known algorithm for creating maximally uniform messages, the best approach may be trial and error, listening for the one case that sound least disturbing. Unlike the prior art, this invention includes human perception in the design and implementation process of that part of the system that is usually considered only from a detection perspective. The perceptual constraint dramatically narrows the range of choices. The use of perception has not been recognized in the prior art, except for the obvious consideration of masking. However, this invention recognizes the need to use the perceptual criteria in all aspects of the watermarking design process.

Figure 14A:
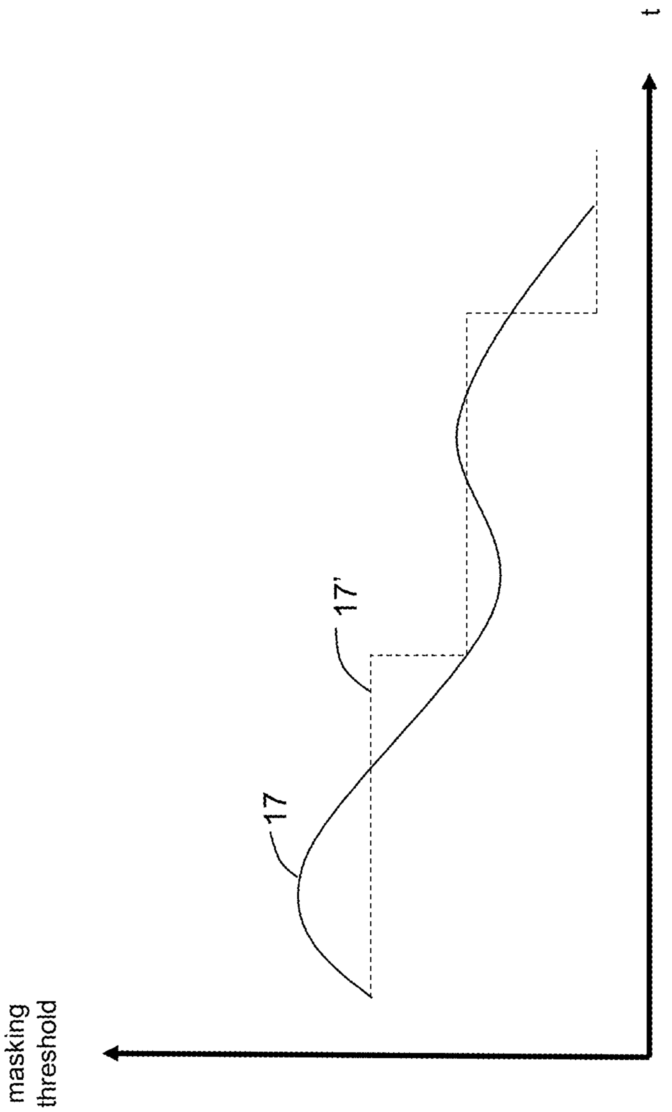
FIG. 14A shows a curve illustrating how to preserve constant amplitude symbols after masking control.
Figure 14B:
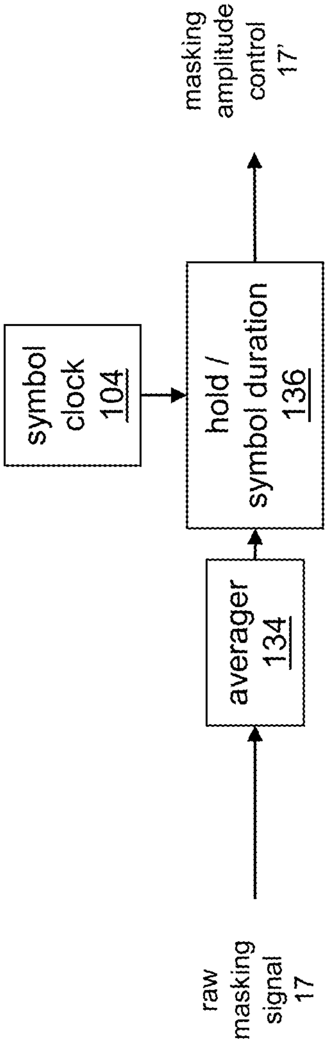
FIG. 14B shows a system to create the constant amplitude symbols of FIG. 14A.

FIGS. 14A and 14B show another way to optimize the trade-off between decoding and audible symbols. The output signal 17 from the masking module 112 of FIG. 4 is shown in FIG. 14A as a solid line. The output signal 17 is a continuous waveform that modulates the encoded message signal 11. Ideally this waveform should be constant for the duration of a symbol.

FIG. 14B shows that this waveform can be averaged at 134 and then its output can be held constant at 136 for the symbol duration. The output 17' is shown in FIG. 14A as a dotted curve and it allows some parts of the symbol to be above the masking threshold in exchange for keeping the amplitude constant for the symbol. Constant amplitude symbols are much more likely to be decoded correctly, and they are more robust in the presence of noise. A symbol that has amplitude of 1.0 for its first half and amplitude of 0.2 for the second half is much worse than a symbol with uniform amplitude of 0.6 for the duration. Moreover, said symbol could have amplitude reduced to 0.3 and still be more noise robust than a symbol composed of two regions, 1.0 and 0.2. The benefit of having symbols that sound benign is thus clear since there are cases where allowing the encoded signal to exceed the masking threshold has a large decode performance benefit.

Figure 15:
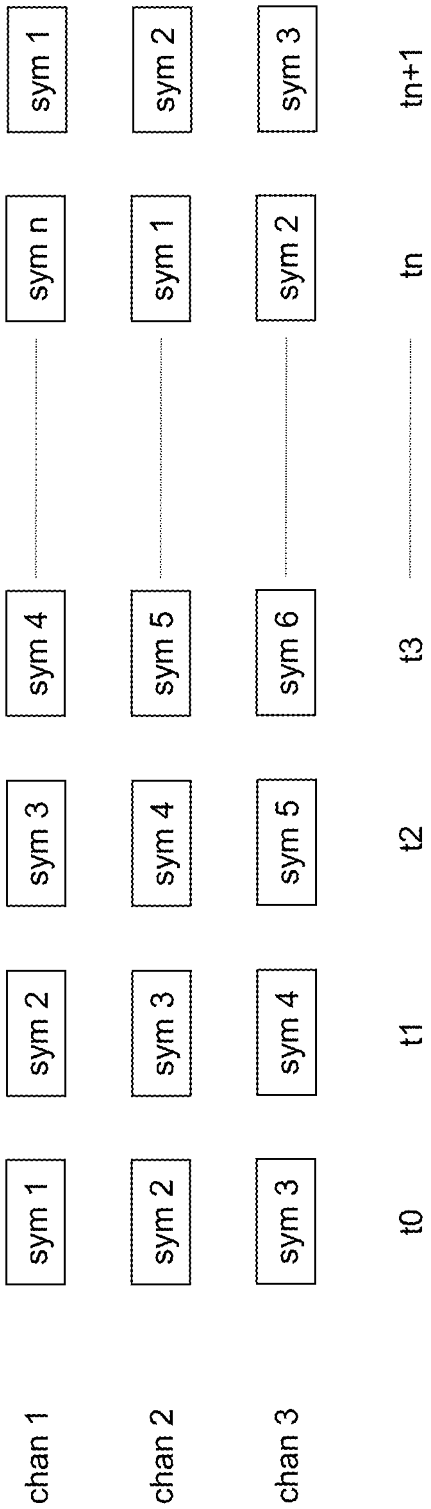
FIG. 15 shows time skewed messages across multiple channels.

FIG. 15 illustrates a further improvement to reduce the consequences of a bursty masking. There are time regions in speech that are equivalent to silence during which there can be no watermark symbols injected into the signal. Silence obviously has no masking power and any symbols would be clearly audible. There is intrinsic silence in speech in addition to a pause in talking. Plosive phonemes, such as /p/ and /t/ have a silent region when all articulation stop, albeit for a short duration. If the various channels, each of which carries the identical message information are time skewed, then a silent interval will not destroy all representations of the same symbol. In this illustration of FIG. 15, each channel is skewed in time by one symbol. If there are 10 channels, and if there is a temporal region with good masking over all the channels, then 10 symbols can be decoded at a single time. Without time skewing the messages, a silence interval will kill all manifestations of a single symbol. Time skewed messages in channels adds a modest amount of implementation complexity but the benefit in reliability may be justified.

All of the above discussions assume that the optimization and implementation is identical for all of the channels. This would be true of the channels were at similar frequencies such as between 1 and 2 kHz. However, speech is very non-uniform in terms of its spectral content. The dominant energy for vowels and liquid consonants, which are more continuous in time at lower frequencies, namely 300 Hz to 800 Hz. But at these lower frequencies the spectral span of masking is much smaller than at higher frequencies. In other words, lower frequency channels should have symbols with a small bandwidth and hence a longer duration. In addition, spectral components that exceed the masking threshold at lower frequencies are much more benign than higher frequencies. Masking leakage at 2 kHz is particularly ugly compared to leakage at 500 Hz. An obvious optimization would therefore allow for different optimization at different channel frequencies. But to minimize the implementation complexity, the various channels should be scaled at integer multiples. For example, one might have a 40 Hz bandwidth with 30 milliseconds duration for channels above 1 kHz and a 20 Hz bandwidth with 60 milliseconds duration for channels below. When symbol duration is larger, the total message length is correspondingly larger. It this example, there would be two messages in the higher frequency channels for each message in the lower frequency channel. One could have three channel regions with ratios of 1:2:3, such that for each message in the lowest channel there would be 2 in the next region, and 3 in the last region.

Figure 16:
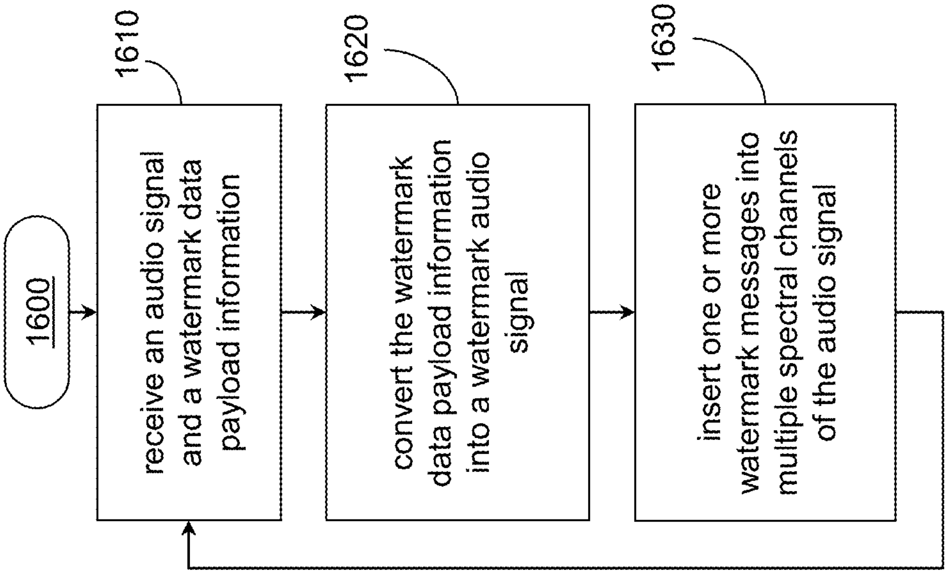
FIG. 16 shows an exemplary method for a machine or group of machines to watermark an audio signal.

Exemplary methods may be better appreciated with reference to the flow diagram of FIG. 16. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an exemplary methodology. Furthermore, additional methodologies, alternative methodologies, or both can employ additional blocks, not illustrated.

In the flow diagram, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

FIG. 16 illustrates a flow diagram for an exemplary method 1600 for a machine or group of machines to watermark an audio signal. At 1610, the method 1600 includes receiving an audio signal and watermark data payload information. At 1620, the method 1600 converts the watermark data payload information into a watermark audio signal including one or more watermark messages corresponding to the watermark data payload information. Each of the one or more watermark messages comprises multiple symbols. Each of the multiple symbols corresponds to a respective audio segment. At 1630, the method 1600 includes inserting the one or more watermark messages into multiple spectral channels of the audio signal. Each of the multiple spectral channels occupies a different frequency range and each of the multiple symbols has a time duration that ranges from 20 milliseconds to 50 milliseconds.

Figure 17:
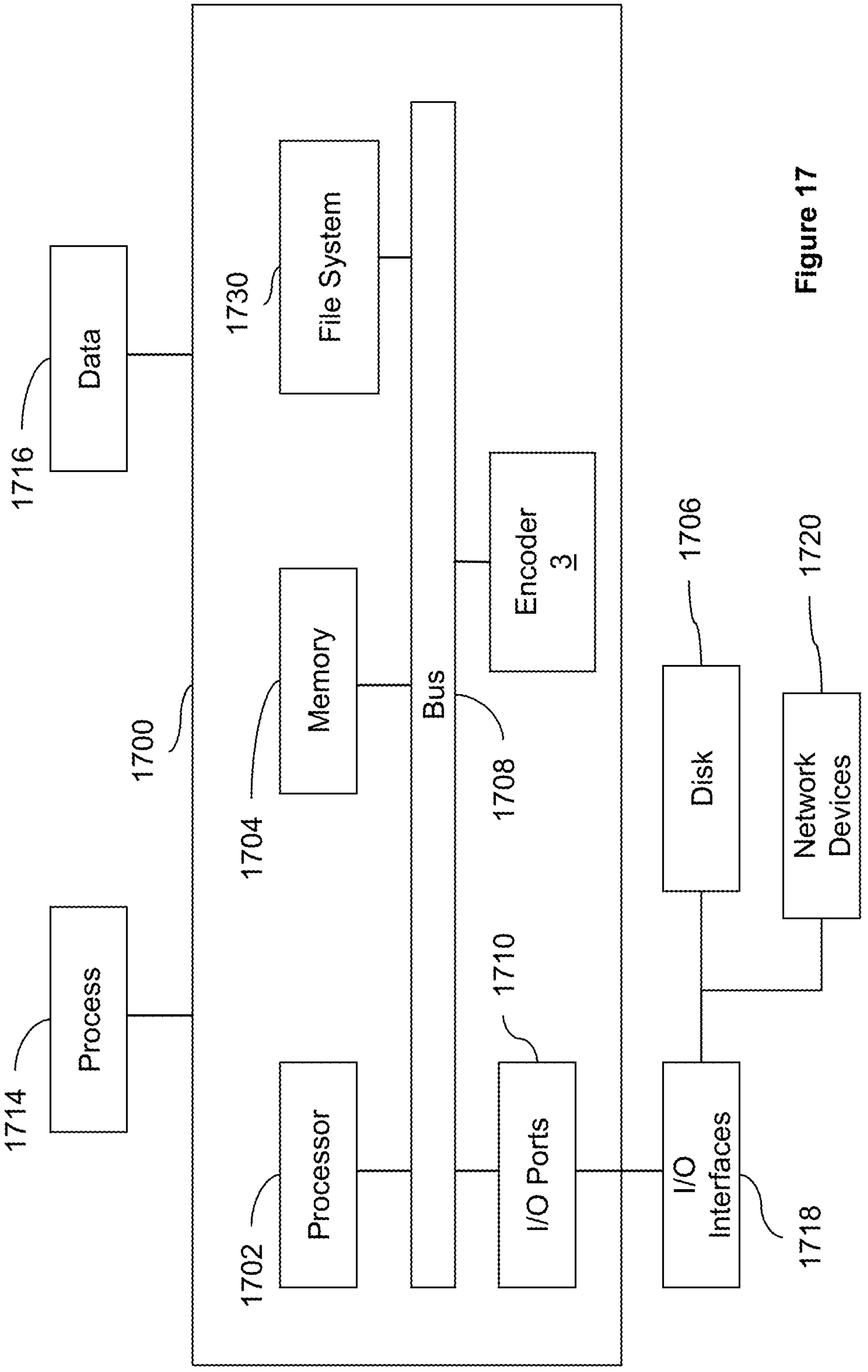
FIG. 17 shows an exemplary machine or group of machines to watermark an audio signal.

FIG. 17 illustrates a block diagram of an exemplary machine or group of machines 1700 to watermark an audio signal. The machine 1200 includes a processor 1702, a memory 1704, and I/O Ports 1710 operably connected by a bus 1708.

In one example, the machine 1700 may receive input signals including the programming audio signal 5, the watermark payload 4, etc. and output signals including the watermark signal 11, the adjusted watermark signal 11', the composite output signal 15, etc. via, for example, I/O Ports 1710 or I/O Interfaces 1718. The machine 1700 may also include the encoder 3 as described above. Thus, the encoder 3 may be implemented in machine 1700 as hardware, firmware, software, or a combination thereof and, thus, the machine 1700 and its components may provide means for performing functions described herein as performed by the encoder 3, the encode 10, the masker 6, etc.

The processor 1702 can be a variety of various processors including dual microprocessor and other multi-processor architectures. The memory 1704 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 1706 may be operably connected to the machine 1700 via, for example, an I/O Interfaces (e.g., card, device) 1718 and an I/O Ports 1710. The disk 1706 can include, but is not limited to, devices like a magnetic disk drive, a solid state disk drive, a floppy disk drive, a tape drive, a Zip drive, a flash memory card, or a memory stick. Furthermore, the disk 1706 can include optical drives like a CD-ROM, a CD recordable drive (CD-R drive), a CD rewriteable drive (CD-RW drive), or a digital video ROM drive (DVD ROM). The memory 1704 can store processes 1714 or data 1716, for example. The disk 1706 or memory 1704 can store an operating system that controls and allocates resources of the machine 1700.

The bus 1708 can be a single internal bus interconnect architecture or other bus or mesh architectures. While a single bus is illustrated, it is to be appreciated that machine 1700 may communicate with various devices, logics, and peripherals using other busses that are not illustrated (e.g., PCIE, SATA, Infiniband, 1394, USB, Ethernet). The bus 1708 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The machine 1700 may interact with input/output devices via I/O Interfaces 1718 and I/O Ports 1710. Input/output devices can include, but are not limited to, a keyboard, a microphone, a pointing and selection device, cameras, video cards, displays, disk 1706, network devices 1720, and the like. The I/O Ports 1710 can include but are not limited to, serial ports, parallel ports, and USB ports.

The machine 1700 can operate in a network environment and thus may be connected to network devices 1720 via the I/O Interfaces 1718, or the I/O Ports 1710. Through the network devices 1720, the machine 1700 may interact with a network. Through the network, the machine 1700 may be logically connected to remote computers. The networks with which the machine 1700 may interact include, but are not limited to, a local area network (LAN), a wide area network (WAN), and other networks. The network devices 1720 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 1720 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

The invention claimed is:

1. A method for a machine or group of machines to watermark an audio signal, the method comprising:

receiving an audio signal;

receiving watermark data payload information;

converting the watermark data payload information into a watermark audio signal including one or more watermark messages corresponding to the watermark data payload information, each of the one or more watermark messages comprising multiple symbols, each of the multiple symbols corresponding to a respective audio segment; and inserting the one or more watermark messages into multiple spectral channels of the audio signal, wherein each of the multiple spectral channels occupies a different frequency range, wherein bandwidth of a first spectral channel located in a first frequency region is smaller than bandwidth of a second spectral channel located in a second frequency region, and wherein time duration of symbols inserted in the first spectral channel in the first frequency region is longer than time duration of symbols inserted in the second spectral channel of the second frequency region.

2. The method of claim 1, wherein bandwidth of a spectral channel, from the multiple spectral channels, is equal to 1 divided by the time duration of a respective symbol, from the multiple symbols, in the spectral channel.

3. The method of claim 1, wherein bandwidth of a spectral channel, from the multiple spectral channels, is equal to a number divided by the time duration of a respective symbol, from the multiple symbols, in the spectral channel, wherein the number is in the range of 0.7 to 2.5.

4. The method of claim 1, wherein the multiple symbols include a pair of complementary audio segments, a first audio segment of the complementary audio segments represents a digital 0 and a second audio segment of the complementary audio segments represents a digital 1.

5. The method of claim 1, wherein the multiple symbols include a pair of complementary audio segments, a first audio segment of the complementary audio segments represents a digital 0 and a second audio segment of the complementary audio segments represents a digital 1, and a product of the first audio segment and the second audio segment averaged over their time duration is approximately zero amplitude.

6. The method of claim 1, wherein the multiple symbols include a pair of complementary audio segments, a first audio segment of the complementary audio segments represents a digital 0 and a second audio segment of the complementary audio segments represents a digital 1, and wherein energy of the first audio segment is spread evenly over a spectral range of the first audio segment and energy of the second audio segment is spread evenly over a spectral range of the second audio segment.

7. The method of claim 1, wherein the multiple symbols include a pair of complementary audio segments each of which has a peak to average ratio that is less than 2.0.

8. The method of claim 1, wherein the multiple symbols include a pair of complementary audio segments having similar or identical perception to a human listener.

9. The method of claim 1, wherein, once an audio segment has been inserted into a spectral channel of the audio signal, amplitude of the audio segment is held constant for the time duration of the audio segment regardless of whether the amplitude of the audio segment is masked by the audio signal.

10. The method of claim 1, wherein bandwidth of a first spectral channel located in a first frequency region is smaller than bandwidth of a second spectral channel located in a second frequency region.

11. The method of claim 1, wherein each of the multiple symbols has a time duration that ranges from 20 milliseconds to 50 milliseconds.

12. The method of claim 1, wherein bandwidth of a first spectral channel located in a first frequency region is smaller than bandwidth of a second spectral channel located in a second frequency region, and wherein respective bandwidths of the multiple spectral channels increase with frequency and respective time durations of symbols inserted in the multiple spectral channels decrease with frequency.

13. The method of claim 1, wherein bandwidth of a first spectral channel located in a first frequency region is smaller than bandwidth of a second spectral channel located in a second frequency region, and wherein time duration of a symbol inserted in the first spectral channel is longer than time duration of a symbol inserted in the second spectral channel, and each of the multiple spectral channels has the same product of symbol bandwidth multiplied by symbol time duration.

14. The method of claim 1, wherein bandwidth of a first spectral channel located in a first frequency region is smaller than bandwidth of a second spectral channel located in a second frequency region, and wherein all of the symbols in multiple spectral channels have a same product of bandwidth multiplied by time duration, which is in the range of 1 to 2.5.

15. The method of claim 1, wherein bandwidth of a first spectral channel located in a first frequency region is smaller than bandwidth of a second spectral channel located in a second frequency region, and wherein bandwidth of the first spectral channel located at the first frequency region is between 500 Hz and 1,500 Hz and bandwidth of the second spectral channel located at the second frequency region is between 1000 Hz and 3,000 Hz.

16. The method of claim 1, where the inserting the one or more watermark messages into the multiple spectral channels of the audio signal includes inserting the watermark messages at times that are skewed such that a given symbol in a first instance of a watermark message does not appear in a first spectral channel at the same time as the given symbol in a second instance of the watermark message appears in a second spectral channel.

17. The method of claim 1, comprising:

adding one or more symbols to a watermark message such that uniqueness of the one or more symbols or a combination the one or more symbols indicates start of the watermark message for synchronization.

18. The method of claim 1, wherein a first watermark message has a different length from a length of a second watermark message, the length of the first watermark message divided by the length of the second watermark message producing an integer ratio.

19. A machine or group of machines for watermarking audio, comprising:

an input that receives an audio signal and watermark data payload information;

an encoder configured to convert the watermark data payload information into a watermark audio signal including one or more watermark messages corresponding to the watermark data payload information, each of the one or more watermark messages comprising multiple symbols, each of the multiple symbols corresponding to a respective audio segment; and a processor configured to insert the one or more watermark messages into multiple spectral channels of the audio signal, wherein each of the multiple spectral channels occupies a different frequency range, and wherein bandwidth of a first spectral channel located in a first frequency region is smaller than bandwidth of a second spectral channel located in a second frequency region, and time duration of symbols inserted in the first spectral channel in the first frequency region is longer than time duration of symbols inserted in the second spectral channel of the second frequency region.

20. The machine or group of machines of claim 19, wherein the processor is configured to insert the one or more watermark messages such that bandwidth of a spectral channel, from the multiple spectral channels, is equal to 1 divided by the time duration of a respective symbol, from the multiple symbols, in the spectral channel.

21. The machine or group of machines of claim 19, wherein the processor is configured to insert the one or more watermark messages such that bandwidth of a spectral channel, from the multiple spectral channels, is equal to a number divided by the time duration of a respective symbol, from the multiple symbols, in the spectral channel, wherein the number is in the range of 0.7 to 2.5.

22. The machine or group of machines of claim 19, wherein the encoder is configured to convert the watermark data payload information into the watermark audio signal such that the multiple symbols include a pair of complementary audio segments, a first audio segment of the complementary audio segments represents a digital 0 and a second audio segment of the complementary audio segments represents a digital 1.

23. The machine or group of machines of claim 19, wherein the encoder is configured to convert the watermark data payload information into the watermark audio signal such that the multiple symbols include a pair of complementary audio segments, a first audio segment of the complementary audio segments represents a digital 0 and a second audio segment of the complementary audio segments represents a digital 1, and a product of the first audio segment and the second audio segment averaged over their time duration is approximately zero amplitude.

24. The machine or group of machines of claim 19, wherein the encoder is configured to convert the watermark data payload information into the watermark audio signal such that the multiple symbols include a pair of complementary audio segments, a first audio segment of the complementary audio segments represents a digital 0 and a second audio segment of the complementary audio segments represents a digital 1, and energy of the first audio segment is spread evenly over a spectral range of the first audio segment and energy of the second audio segment is spread evenly over a spectral range of the second audio segment.

25. The machine or group of machines of claim 19, wherein the encoder is configured to convert the watermark data payload information into the watermark audio signal such that the multiple symbols include a pair of complementary audio segments each of which has a peak to average ratio that is less than 1.5.

26. The machine or group of machines of claim 19, wherein the encoder is configured to convert the watermark data payload information into the watermark audio signal such that the multiple symbols include a pair of complementary audio segments having similar or identical perception to a human listener.

27. The machine or group of machines of claim 19, wherein the processor is configured to insert the one or more watermark messages such that, once the processor has inserted an audio segment into a spectral channel of the audio signal, amplitude of the audio segment is held constant for the time duration of the audio segment regardless of whether the amplitude of the audio segment is masked by the audio signal.

28. The machine or group of machines of claim 19, wherein the encoder is configured to convert the watermark data payload information into the watermark audio signal and the processor is configured to insert the one or more watermark messages such that bandwidth of a first spectral channel located in a first frequency region is smaller than bandwidth of a second spectral channel located in a second frequency region.

29. The machine or group of machines of claim 19, wherein each of the multiple symbols has a time duration that ranges from 20 milliseconds to 50 milliseconds.

30. The machine or group of machines of claim 19, wherein the encoder is configured to convert the watermark data payload information into the watermark audio signal and the processor is configured to insert the one or more watermark messages such that bandwidth of a first spectral channel located in a first frequency region is smaller than bandwidth of a second spectral channel located in a second frequency region, and respective bandwidths of the multiple spectral channels increase with frequency and respective time durations of symbols inserted in the multiple spectral channels decrease with frequency.

31. The machine or group of machines of claim 19, wherein the encoder is configured to convert the watermark data payload information into the watermark audio signal and the processor is configured to insert the one or more watermark messages such that bandwidth of a first spectral channel located in a first frequency region is smaller than bandwidth of a second spectral channel located in a second frequency region, time duration of a symbol inserted in the first spectral channel is longer than time duration of a symbol inserted in the second spectral channel, and each of the multiple spectral channels has the same product of symbol bandwidth multiplied by symbol time duration.

32. The machine or group of machines of claim 19, wherein the encoder is configured to convert the watermark data payload information into the watermark audio signal and the processor is configured to insert the one or more watermark messages such that bandwidth of a first spectral channel located in a first frequency region is smaller than bandwidth of a second spectral channel located in a second frequency region, and all of the symbols in multiple spectral channels have a same product of bandwidth multiplied by time duration, which is in the range of 1 to 2.5.

33. The machine or group of machines of claim 19, wherein the encoder is configured to convert the watermark data payload information into the watermark audio signal and the processor is configured to insert the one or more watermark messages such that bandwidth of a first spectral channel located in a first frequency region is smaller than bandwidth of a second spectral channel located in a second frequency region, and bandwidth of the first spectral channel located at the first frequency region is between 500 Hz and 1,500 Hz and bandwidth of the second spectral channel located at the second frequency region is between 1000 Hz and 3,000 Hz.

34. The machine or group of machines of claim 19, wherein the processor is configured to insert the one or more watermark messages at times that are skewed such that a given symbol in a first instance of a watermark message does not appear in a first spectral channel at the same time as the given symbol in a second instance of the watermark message appears in a second spectral channel.

35. The machine or group of machines of claim 19, wherein the encoder is configured to add one or more symbols to a watermark message such that uniqueness of the one or more symbols or a combination the one or more symbols indicates start of the watermark message for synchronization.

36. The machine or group of machines of claim 19, wherein the encoder is configured to convert the watermark data payload information into the watermark audio signal such that a first watermark message has a different length from a length of a second watermark message, the length of the first watermark message divided by the length of the second watermark message resulting on an integer ratio.

* * * * *